United States Patent
Acosta et al.

(10) Patent No.: US 7,473,658 B2
(45) Date of Patent: Jan. 6, 2009

(54) PARTIALLY FLUORINATED AMINO ACID DERIVATIVES AS GELLING AND SURFACE ACTIVE AGENTS

(75) Inventors: Erick Jose Acosta, Sugar Land, TX (US); Anilkumar Raghavanpillai, Greenville, DE (US); Sheng Peng, Hockessin, DE (US); Stefan Reinartz, Wilmington, DE (US); Sunti Moudgil, Wilmington, DE (US)

(73) Assignee: E. I. du Pont Nemours and Company, Wilmington, DE (US)

( * ) Notice: Subject to any disclaimer, the term of this patent is extended or adjusted under 35 U.S.C. 154(b) by 0 days.

(21) Appl. No.: 11/598,293

(22) Filed: Nov. 13, 2006

(65) Prior Publication Data

US 2008/0113573 A1    May 15, 2008

(51) Int. Cl.
   *B32B 5/02* (2006.01)
   *C08L 27/12* (2006.01)
(52) U.S. Cl. ............................. 442/93; 442/94; 524/544
(58) Field of Classification Search .................... 442/82, 442/93, 94, 91, 86
   See application file for complete search history.

(56) References Cited

U.S. PATENT DOCUMENTS

| | | | |
|---|---|---|---|
| 3,253,978 A | 5/1966 | Bodendorf et al. | |
| 3,338,825 A | 8/1967 | Taggart | |
| 3,979,469 A | 9/1976 | Jager | |
| 4,610,863 A | 9/1986 | Tewari et al. | |
| 4,629,652 A | 12/1986 | Carlson et al. | |
| 4,894,157 A | 1/1990 | Johnson | |
| 5,116,575 A | 5/1992 | Badertscher et al. | |
| 5,156,895 A | 10/1992 | Martin | |
| 5,338,676 A | 8/1994 | Mitsushima et al. | |
| 5,340,613 A | 8/1994 | Hanzalik et al. | |
| 5,398,846 A | 3/1995 | Corba et al. | |
| 5,481,028 A | 1/1996 | Petrov et al. | |
| 5,528,152 A | 6/1996 | Hinoshita et al. | |
| 5,624,634 A | 4/1997 | Brougham et al. | |
| 5,627,217 A | 5/1997 | Rilling et al. | |
| 5,772,735 A | 6/1998 | Sehgal et al. | |
| 5,885,909 A | 3/1999 | Rudisill et al. | |
| 5,892,116 A | 4/1999 | Weiss et al. | |
| 6,210,639 B1 | 4/2001 | Vlass et al. | |
| 6,320,018 B1 | 11/2001 | Sijbesma et al. | |
| 6,391,840 B1 | 5/2002 | Thompson et al. | |
| 6,420,466 B1 | 7/2002 | Haubennestel | |
| 6,548,431 B1 | 4/2003 | Bansal et al. | |

(Continued)

FOREIGN PATENT DOCUMENTS

DE    101 08 543 C1    2/2001

(Continued)

OTHER PUBLICATIONS

Co-pending U.S. Appl. No. 11/598,407, filed Nov. 13, 2006.*

(Continued)

*Primary Examiner*—Lynda Salvatore

(57) ABSTRACT

Disclosed are partially fluorinated amino acid derivatives useful as organogelators and surface treatment materials to provide oil- and water-repellency properties to substrates. Also disclosed are composite materials, comprising a porous support and a porous nanoweb. The porous nanoweb contains fibrous structures of about 10 nm to about 1000 nm effective average fiber diameter as determined with electron microscopy.

17 Claims, 2 Drawing Sheets

U.S. PATENT DOCUMENTS

| | | |
|---|---|---|
| 6,573,398 B2 | 6/2003 | Hansen et al. |
| 6,734,320 B2 | 5/2004 | Beatty |
| 6,797,655 B2 | 9/2004 | Rudisill |
| 6,831,025 B2 | 12/2004 | Rudisill et al. |
| 6,872,243 B2 | 3/2005 | Brenton et al. |
| 6,995,125 B2 | 2/2006 | Dasque et al. |
| 2004/0038014 A1 | 2/2004 | Schaefer et al. |
| 2004/0092185 A1 | 5/2004 | Grafe et al. |
| 2004/0203149 A1 | 10/2004 | Childs et al. |
| 2004/0213918 A1 | 10/2004 | Mikhael et al. |
| 2004/0223987 A1 | 11/2004 | Ferrari |
| 2005/0008526 A1 | 1/2005 | Bianchetti et al. |
| 2005/0139608 A1 | 6/2005 | Muehlhausen et al. |

FOREIGN PATENT DOCUMENTS

| | | |
|---|---|---|
| EP | 0 807 156 B1 | 3/2001 |
| WO | WO 95/11877 A1 | 5/1995 |
| WO | WO 98/017377 A1 | 4/1998 |
| WO | WO 11/11713 A1 | 3/2000 |
| WO | WO 00/035998 A1 | 6/2000 |
| WO | WO 03/080905 A1 | 10/2003 |
| WO | WO 2004/027140 A1 | 4/2004 |
| WO | WO 2005/037415 A1 | 4/2005 |
| WO | WO 2005/113702 A1 | 12/2005 |

OTHER PUBLICATIONS

Honda et. al., Molecular Aggregation Structure and Surface Properties of Poly(Fluoroalkyl Acrylate) Thin Films, Macromolecules, 2005, vol. 38:5699-5705.

Carey et. al., Multistep Syntheses, Advanced Organic Chemistry, Third Edition, Part B, 1990, pp. 686-689.

Valli et. al., A Simple, Convenient, and Efficient Method for the Synthesis of Isocyanates From Urethanes, J. Org. Chem., 1995, vol. 60:257-258.

Buckmann et. al., Functionalization of Poly(ethylene glycol) and Monomethoxy-Poly (ethylene glycol), Makromol. Chem., 1981, vol. 182:1379-1384.

Balague et. al., Synthesis of Fluorinated Telomers, Part 1, Telomerization of Vinylidene of Vinylidene Fluoride With Perfluoroalkyl Iodidies, J. Flourine Chem., 1995, vol. 70:215-223.

Trabelsi et. al., Synthese des 2-F-Alkylethylamines: Optimisation de L'Obtention des Azotures de 2-F-Alkylethyle et de Leur Reduction en Amines, J. Fluorine Chem., 1994, vol. 69:115-117.

Goshe et. al., Supramolecular Recognition: on the Kinetic Lability of Thermodynamically Stable Host-Guest Association Complexes, Proc. Nat. Acad. Sci., 2002, vol. 99:4823-4829.

Arthur W. Adamson, Physical Chemistry of Surfaces, 4th Edition, 1982, pp. 338-361.

Yamanaka et. al., Construction of Superhydrophobic Surfaces by Fibrous Aggregation of Perfluoroalkyl Chain-Containing Organogelators, Chem. Commun., 2006, pp. 2248-2250.

Huang et. al., Generation of Microcellular Materials via Self-Assembly in Carbon Dioxide, Chem. Mat., 2002, vol. 14:4273-4280.

Shi et. al., The Gelation of CO2: A Sustainable Route to the Creation of Microcellular Materials, Science, 1999, vol. 286:1540-1543.

Lange et. al., Hydrogen-Bonded Supramolecular Polymer Networks, J. Polym. Sci., A: Polym. Chem., 1999, vol. 37:3657-3670.

Carr et. al., The Design of Organic Gelators: Solution and Solid State Properties of a Family of Bis-Ureas, Tetrahedron Lett., 1998, vol. 39:7447-7450.

Weiss et. al., Organogels and Low Molecular Mass Organic Gelators, Adv. Mater., 2000, vol. 12:1237-1247.

U.S. Appl. No. 10/983,513, filed Nov. 8, 2004, Bryner et al.

* cited by examiner $R^4$ = t-butyl, 9-fluorenylmethyl, and benzyl

PARTIALLY FLUORINATED AMINO ACID DERIVATIVES AS GELLING AND SURFACE ACTIVE AGENTS

FIELD OF INVENTION

The present invention relates to fluorinated compounds containing short perfluorinated alkyl chains that are useful as organogelators and surface treatment materials to provide oil- and water-repellency properties to substrates.

BACKGROUND

Various compositions are known to be useful as treating agents to provide surface effects to substrates. Surface effects include repellency to moisture, soil, and stains, and other effects, which are particularly useful for fibrous substrates and other substrates such as hard surfaces. Many such treating agents are fluorinated polymers or copolymers.

Most commercially available fluorinated polymers useful as treating agents for imparting repellency to substrates contain predominately eight or more carbons in the perfluoroalkyl chain to provide the desired repellency properties. Honda et al, in Macromolecules, 2005, 38, 5699-5705 disclose that for perfluoroalkyl chains of greater than 8 carbons, orientation of the $R_f$ groups is maintained in a semi-crystalline configuration while for such chains having less than 6 carbon atoms, reorientation occurs.

Various attempts have been made to improve particular surface effects and to increase the fluorine efficiency; i.e., boost the efficiency or performance of treating agents so that lesser amounts of the expensive fluorinated polymer are required to achieve the same level of performance or have better performance using the same level of fluorine. It is desirable to reduce the chain length of the perfluoroalkyl groups thereby reducing the amount of fluorine present, while still achieving the same or superior surface effects. Use of shorter chain perfluoroalkyl groups is one way to reduce the amount of fluorine present. Other approaches provide alternative mechanisms for structure and ordering in the fluorinated materials having short fluorinated tails. For instance, one approach is to combine the characteristics of structures known to undergo gelation via, for instance, hydrogen bonding, with short perfluorinated alkyl moieties. The ordering imposed upon the perfluorinated alkyl groups by the hydrogen bonding networks may amplify the ability of the perfluorinated alkyl moieties to order, thus increasing the fluorine efficiency of surface treating agents comprising such structures.

There is a continuing need for compositions that improve the repellency and stain resistance of treating agents for fibrous and/or porous substrates and hard surface substrates while using lower levels of fluorine. The present invention is directed to these, and other, important ends.

SUMMARY OF INVENTION

One aspect of the invention is a composition of formula (I)

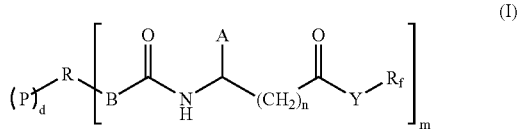

wherein A is independently selected from the group consisting of: hydrogen, $C_1$-$C_5$ straight and branched chain alkyl, phenyl, benzyl, and —C(O)—Y—$R_f$;

Y is independently —O— or —NH—;

$R_f$ is a monovalent group selected from the group consisting of formulas (IIa), (IIb) (IIc) and (IId):

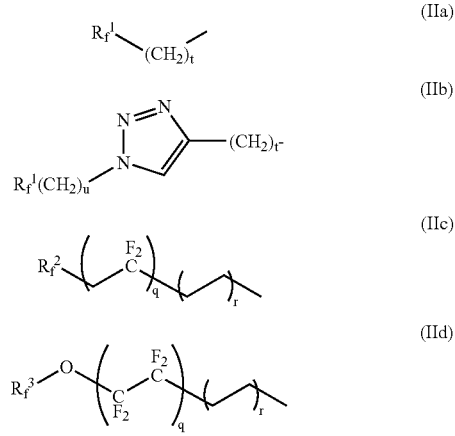

$R_f^1$ and $R_f^2$ are $C_1$-$C_6$ linear or branched perfluoroalkyl;

$R_f^3$ is a $C_1$ to $C_7$ linear or branched perfluoroalkyl group, optionally interrupted by one, two or three ether oxygen atoms;

u and t are independently integers of 1 to 10;

q and r are independently integers of 1 to 3;

n is an integer of 0 to 10;

B is independently selected from the group consisting of: —O—, —NH—, and a covalent bond;

P is selected from the group consisting of: $(R^1O)_3Si$— and $CH_2$=$C(R^2)$—$CO_2$—;

wherein $R^1$ is a $C_1$-$C_6$ straight and branched chain alkyl; $R^2$ is a hydrogen, F, Cl or —$CH_3$;

R is a monovalent, divalent, trivalent or tetravalent group having 1 to 60 carbon atoms;

d is an integer of 0 or 1; and m is an integer of 1-4;

with the provisos that m+d≦4;

R has at least m+d carbon atoms with each valence residing on a different carbon atom; and when Y is —O—, $R_f$ is selected from formulas (IIb), (IIc) or (IId).

Another aspect of the invention is a composite material comprising a porous support and a porous nanoweb, wherein said porous nanoweb comprises fibrous structures of about 10 nm to about 1000 nm effective average fiber diameter as determined with electron microscopy; said fibrous structures comprising one or more compositions of formula (I) as described above.

Another aspect of the invention is a solid substrate to which has been applied a composition of formula (I) as described above.

DETAILED DESCRIPTION

Unless otherwise defined, all technical and scientific terms used herein have the same meaning as commonly understood by one of ordinary skill in the art to which this invention pertains. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In various embodiments, in formula (I) R is preferably selected from the group consisting of: $C_1$-$C_{18}$ linear or branched alkyl groups; $C_1$-$C_{18}$ linear or branched alkyl groups having, or interrupted by, a $C_4$-$C_{16}$ cycloaliphatic group; $C_1$-$C_{18}$ linear or branched alkyl groups having, or interrupted by, a $C_4$-$C_{16}$ aromatic group; $C_1$-$C_{18}$ linear or branched alkyl groups having, or interrupted by, a $C_4$-$C_{16}$ cycloaliphatic group and a $C_4$-$C_{16}$ aromatic group; $C_4$-$C_{16}$ cycloaliphatic group; a $C_4$-$C_{16}$ aromatic group; and $C_4$-$C_{16}$ cycloaliphatic group having a $C_4$-$C_{16}$ aromatic group; wherein each aromatic group is optionally substituted with one or more Cl or Br; each alkyl and cycloaliphatic group is optionally substituted with one or two carbon-carbon double bonds; each group is optionally interrupted by one to four heteroatoms selected from the group: —O— and —$NR^3$—; and each group is optionally interrupted by one to four linkers selected from the group —S—, —N=, —OC(O)—, —C(O)$NR^3$—, —OC(O)$NR^3$—, —$NR^3$C(O)$NR^3$—; wherein $R^3$ is selected from the group consisting of: hydrogen and $C_1$-$C_4$ alkyl group.

Figure 1:
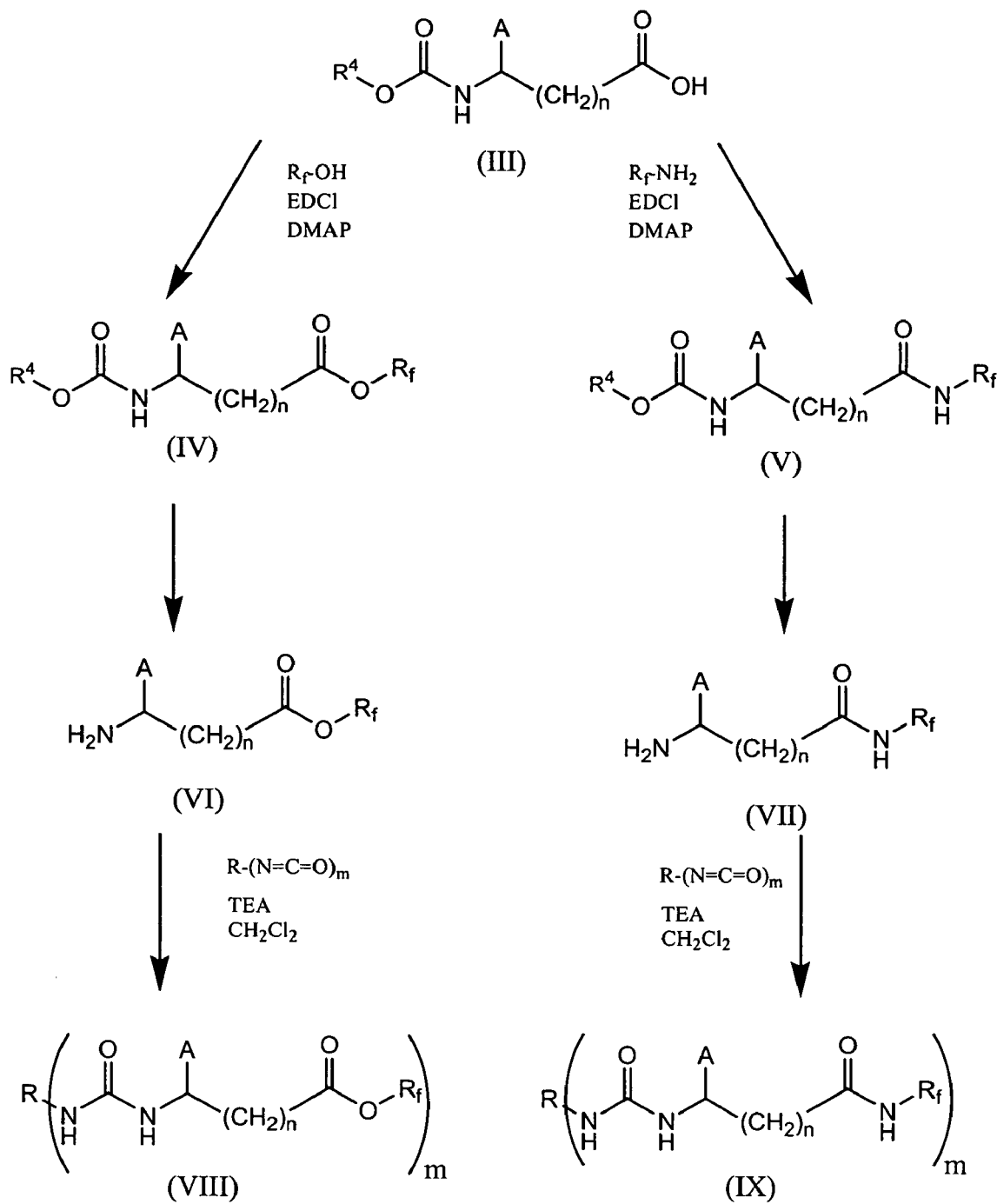
FIG. 1 illustrates the synthesis of some compounds of various embodiments of the invention.

Aspects of the invention include compositions of formula (IV) and (V), illustrated in FIG. 1, useful as synthetic intermediates in forming other compounds of the invention. These structures are defined by formula (I) with m=1, d=0, B=—O—, R=$R^4$=t-butyl, 9-fluorenylmethyl, and benzyl; and A, Y, $R_f$, and n defined as above. Compositions of formula (IV) and (V) are prepared by condensation of corresponding partially fluorinated alcohols, designated $R_f$—OH, and partially fluorinated primary amines, designated $R_f$—$NH_2$, respectively, with N-blocked amino acids of formula (III). The condensations are typically run with equivalent amounts of 1-[3-(dimethylamino)propyl]-3-ethylcarbodiimide hydrochloride (EDCI) coupling agent and dimethylaminopyridine (DMAP) as a catalyst, but other carbodiimide coupling agents and heterocyclic or tertiary amines also can be used.

Referring to FIG. 1, in one embodiment $R^4$ is t-butyl, and the compositions of formula (III) are t-butyloxycarbonyl (N-BOC)-blocked amino acids. The N-BOC-protected amino acids of formula (III) are provided by treatment of the corresponding amino acids, wherein A and n are described above, with t-butyloxycarbonyl chloride according to the general procedures in "Advanced Organic Chemistry" by Francis A. Carey and Richard J. Sundberg (Third Edition, Part B, page 686, 1990, Plenum Press, New York). Many N-BOC amino acids of formula (III) are available from Aldrich Chemical Co., Milwaukee, Wis. and Genscript Corp., Piscataway N.J., 08854. N-BOC amino acids useful in various embodiments of the invention include those listed in Table 1. Wherein isomers are possible, the N-BOC amino acids may be the D-, L-, the racemic mixture, or any combination thereof. Specifically, N-BOC-aspartic acid includes mixtures of isomers derived from racemic 2-aminosuccinic acid.

TABLE 1

N-BOC amino acids of formula (III).

| Structure | Name |
|---|---|
| | N-BOC-glycine |
| | N-BOC-β-alanine |
| | N-BOC-aspartic acid |
| | N-BOC-phenylalanine |
| | N-BOC-alanine |
| | N-BOC-leucine |
| | N-BOC-isoleucine |
| | N-BOC-valine |
| | N-BOC-norleucine |

TABLE 1-continued

N-BOC amino acids of formula (III).

| Structure | Name |
|---|---|
| 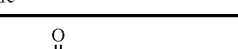 | N-BOC-6-aminohexanoic acid |
| 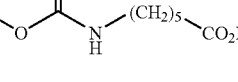 | N-BOC-11-aminoundecanoic acid |

The N-BOC-blocked amino esters (IV) and N-BOC-blocked amino amides (V) can be cleaved with acid, for instance trifluoroacetic acid (TFA), to provide amino esters (VI) and amino amides (VII), respectively, that are useful in synthesis of many compositions of the invention.

In one embodiment $R^4$ is 9-fluorenylmethyl, and the compositions of formula (III) are N-(9-fluorenylmethoxy)carbonyl (N-Fmoc)-blocked amino acids. The N-Fmoc-blocked amino acids of formula (III) are provided by treatment of the corresponding amino acids, wherein A and n are described above, with 9-fluorenylmethoxycarbonyl chloride using procedures similar to the N-BOC-blocked amino esters. The N-Fmoc-blocked amino esters (IV) and N-Fmoc-blocked amino amides (V) can be cleaved with piperidine, to provide amino esters (VI) and amino amides (VII), respectively. Specific preferred N-Fmoc-blocked amino acids of formula (III) are similar to those described in Table 1, wherein the N-BOC group is replaced with a N-Fmoc group. N-Fmoc-blocked amino acids of formula (III) are commercially available from the same sources as the N-BOC materials.

In one embodiment $R^4$ is benzyl, and the compositions of formula (III) are N-(benzyloxycarbonyl)-blocked amino acids (N-Z). The N-Z-blocked amino acids of formula (III) are provided by treatment of the corresponding amino acids, wherein A and n are described above, with benzyloxycarbonyl chloride using procedures similar to the N-BOC-blocked amino esters. The N-Z-blocked amino esters (IV) and N-Z-blocked amino amides (V) can be cleaved with hydrogenation over palladium on carbon to provide amino esters (VI) and amino amides (VII), respectively. Specific preferred N-Z-blocked amino acids of formula (III) are similar to those described in Table 1, wherein the N-BOC group is replaced with a N-Z group. N-Z-blocked amino acids of formula (III) are commercially available from the same sources as the N-BOC materials.

Condensations with Isocyanates and Polyisocyanates

Other embodiments include compositions of formula (VIII) and (IX), illustrated in FIG. 1, and useful as organogelators and/or surface active agents. These structures are defined by formula (I) with m=1 to 4, d=0, B=—NH—, and A, Y, $R_f$, R, and n defined as above. More preferred compositions are those wherein m=1 or 2, d=0; and most preferred are those wherein m=1. Other preferred compositions are those wherein A is H or —C(O)—Y—$R_f$; and more preferred are those wherein A is H, and n=1 ore 2.

Compositions of formula (VIII) and (IX) can be provided by condensation of isocyanates or polyisocyanates, represented by R—(N=C=O)$_m$ with amino esters (VI) and amino amides (VII), respectively. Typically a tertiary amine, for instance triethylamine, is used as catalyst, but other catalysts, or no catalyst, can be used if so desired. Typically a nonhydroxylic hydrocarbon solvent such as toluene or xylenes or a halocarbon such as dichloromethane is used in the condensation.

Monoisocyanates useful in the synthesis of compositions of formula (VIII) and (IX), wherein m=1, include n-dodecylisocyanate, n-octyl isocyanate, n-hexylisocyanate, n-butyl isocyanate, phenyl isocyanate, cyclohexyl isocyanate, and allyl isocyanate.

Other monoisocyanates useful in the synthesis of compositions of formula (VIII) and (IX), wherein m=1, include those derived from condensation of a diisocyanate $R^5$—(NCO)$_2$, with a one equivalent of a monoalcohol, $R^6$—OH, according to the following scheme:

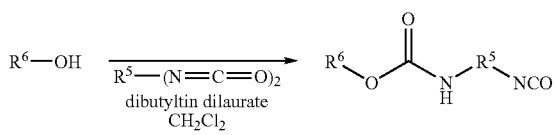

to provide a monoisocyanate having a urethane linkage. These monoisocyanates can be prepared using a stoichiometric excess of diisocyanate, if so desired, followed by removal of the excess diisocyante. Diisocyanates useful in the synthesis of these monoisocyanates are discussed below. Preferred monoalcohols are discussed in the section entitled "Condensation with monoalcohols, diols, triols, and tetraols" below. Especially preferred in the formation of these isocyanates are compounds such as toluene diisocyanate or isophorone diisocyanate; and the monoalcohols, $R^6$—OH, are selected from the group: mPEG-OH and mPEG-PPG-PEG-OH, as discussed below, preferably having weight average molecular weights (Mw) of 200 to about 2000.

Diisocyanates useful in the synthesis of compositions of formula (VIII) and (IX), wherein m=2, include 2,4 and 2,6-toluene diisocyanate, 4,4'-diphenylmethane diisocyante (MDI), 1,3- and 1,4-phenylene diisocyanate, m- and/or p-xylylene diisocyanate (XDI), hexamethylene diisocyanate, tetramethylene diisocyanate, dodecamethylene diisocyanate, methyl pentamethylene diisocyanate, 2,2,4-trimethylhexamethylene diisocyanate, lysine diisocyanate, isophorone diisocyanate (IPDI), 1,3- and 1,4-diisocyanatocyclohexane, methyl cyclohexylene diisocyanate (hydrogenated TDI), dicyclohexylmethane-4,4'-diisocyanate (hydrogenated MDI). They are available from Bayer Inc., Pittsburgh, Pa., and Aldrich Chemical Co., Milwaukee Wis. Preferred are hexamethylene diisocyanate, methyl cyclohexylene diisocyanate, 2,4 and 2,6-toluene diisocyanate, and isophorone diisocyanate.

Other embodiments include compositions of formula (VIII) and (IX) in FIG. 1, wherein m=3, d=0, B=—NH—. One embodiment is a composition wherein R is a trivalent group selected from the formula:

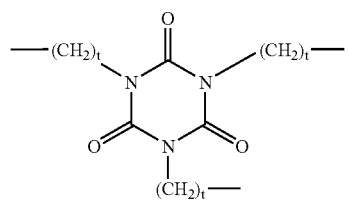

wherein t is defined as above.

Other embodiments include compositions of formula (VIII) and (IX) provided by condensation of monoamines or polyamines corresponding to R—(NH$_2$)$_m$, wherein m=1 to 4, with the isocyanates of formula (X) and (XI) as illustrated in Scheme 2.

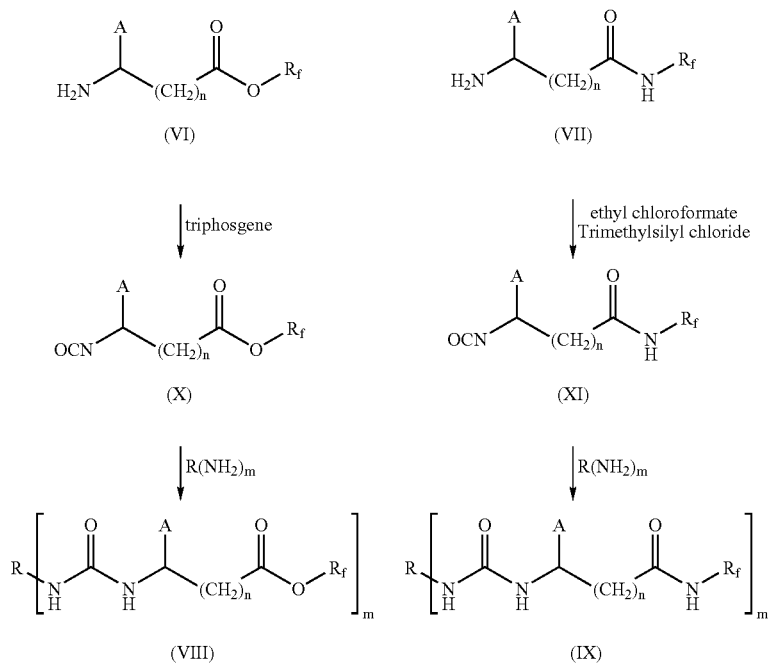

Isocyanates of formula (X) can be provided by reaction of amino esters (VI) with triphosgene in the presence of a suitable base such as triethylamine and a suitable solvent such as toluene or dichloromethane. Compositions of formula (XI) can be provided by reaction of amino amides (VII) with ethyl chloroformate and trimethylsilyl chloride (TMSCl), as disclosed by Kornek, et al, in DE 10108543.

Alternatively, compositions of formula (VIII) and (IX) can be made as illustrated in Scheme 3. Reaction of amines or polyamines represented by R—(NH$_2$)$_m$, wherein m=1 to 4, with methyl chloroformate provides urethanes of formula (XII). Treatment of the urethanes with chlorocatechol borane and triethyl amine, as described by Alper et al, (J. Org. Chem., 60, 257-258, 1995) provides elimination of methanol to form the isocyanates of formula (XIII). The isocyanates (XIII) can undergo reaction with aminoesters (VI) and aminoamides (VII) to provide compositions of formula (VIII) and (IX).

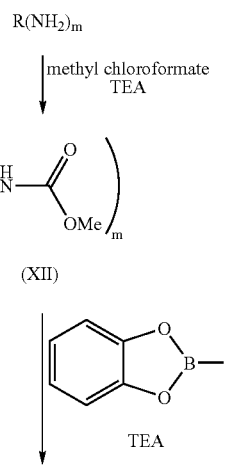

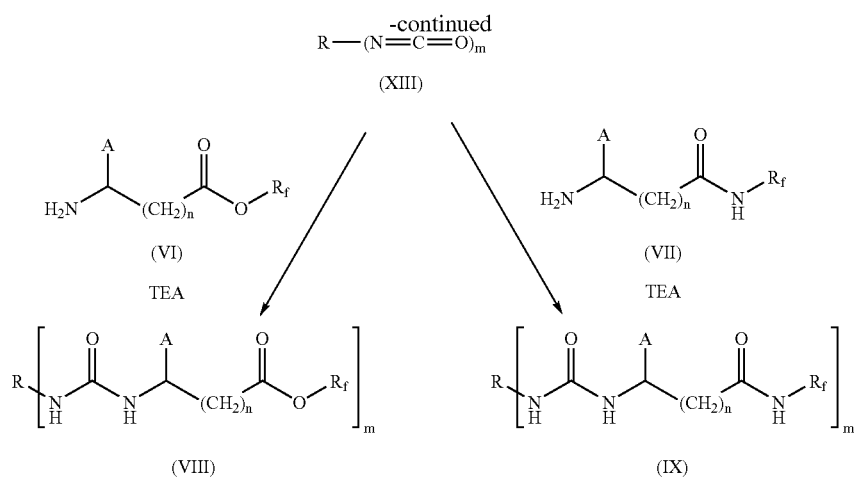

Preferred embodiments include compositions of formula (VIII) and (IX), wherein R is a linear or branched alkyl group of about 10 to about 60 carbon atoms, and more preferably about 20 to 40 carbon atoms, interrupted by about 5 to about 30 —O— heteroatoms, wherein the ratio of —O— heteroatoms to carbon atoms is about 1:2 to about 1:4; more preferably about 1:2 to about 1:3. Within these compositions, preferably the R group has a molecular weight, when each valency is occupied by an —$NH_2$ group, of about 200 to about 1250. These materials are provided from amine terminated polyoxyalkylenes having 1 to 4 amine terminal groups according to Scheme 3.

For instance, wherein m=1, R—$NH_2$ can be an amine terminated polyethylene glycol monomethyl ether (mPEGNH$_2$) or an amine terminated polyethylene glycol-polypropylene glycol-polyethylene glycol triblock monomethyl ether (mPEG-PPG-PEG-NH$_2$). They are available by treatment of corresponding hydroxyl terminated monomethyl ethers with thionyl bromide followed by treatment with ammonia as described by Buckmann et al (Makromol. Chem. 182, p. 1379-1384, 1981). In a similar manner amine terminated monomethyl ethers of random copolymers of ethylene oxide and propylene oxide are also available. Commercial examples of these materials are JEFFAMINE® polyoxyalkyleneamines XTJ-505 and XTJ-506. Preferably amine terminated polyoxyalkylenes having about 5 to about 20 repeat units, and more preferably about 10 to 20 repeat units.

When m=2, R—(NH$_2$)$_2$ can be amine terminated polyethylene glycol ethers (NH$_2$—PEG-NH$_2$), amine terminated polyethylene glycol-polypropylene glycol-polyethylene glycol triblock ethers (NH$_2$—PEG-PPG-PEG-NH$_2$) and amine terminated random copolymers of ethylene oxide and propylene oxide. They are available by synthesis by treatment of the corresponding hydroxy terminated polymers with thionyl chloride and ammonia. Commercial examples of these materials are JEFFAMINE® polyoxyalkyleneamines D-230, D-400, XTJ-500 (MW 600), XTJ-501 (MW 900), and HK-511 (MW 225).

When m=3, R—(NH$_2$)$_3$ can be amine terminated 3-arm polyoxyalkyleneamines. These are available by synthesis by treatment of the corresponding 3-arm hydroxy terminated polyoxyalkylenes with thionyl chloride and ammonia. A commercial example of these materials is JEFFAMINE® polyoxyalkyleneamines T-403 (MW 440).

When m=4, R—(NH$_2$)$_4$ can be amine terminated 4-arm polyoxyalkyleneamines which are useful in providing preferred compositions of formula (VIII) and (IX) according to scheme 3. These are available by synthesis by treatment of the corresponding 4-arm hydroxy terminated polyoxyalkyleneamines with thionyl chloride followed by treatment with ammonia.

Condensation with Carboxylic Acids

Other embodiments include compositions of formula (XXI) and (XXII), illustrated in Scheme 4, and useful as organogelators and/or surface active agents. These structures are defined by formula (I) with m=1 to 4, d=0, B=covalent bond, and A, Y, R$_f$, R, and n defined as above. Preferred are those wherein m=1 or 2. Other preferred compositions are those wherein A is H or —C(O)—Y—R$_f$; and more preferred are those wherein A is H, and n=1 ore 2.

Compositions of formula (XXI) and (XXII) can be provided by condensation of carboxylic acid chlorides or polycarboxylic acid chlorides with amino esters (VI) and amino amides (VII), respectively.

Scheme 4

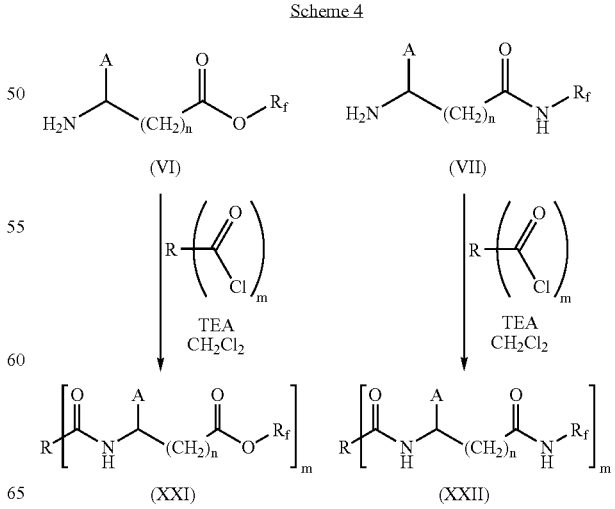

Carboxylic acid chlorides useful in the synthesis of compositions of formula (XXI) and (XXII) wherein m=1 include bicyclo[2.2.1]hept-5-ene-2-carbonyl chloride, butyryl chloride, isobutyryl chloride, pentanoyl chloride, hexanoyl chloride, cyclohexanecarbonyl chloride, benzoyl chloride, methacryloyl chloride, and acryloyl chloride, all available from Aldrich Chemical Co. or by synthesis.

Dicarboxylic acid chlorides useful in the synthesis of compositions of formula (XXI) and (XXII) wherein m=2 include cyclohexane-1,4-dicarboyl dichloride, succinoyl dichloride, adipoyl dichloride, and terephthaloyl dichloride, all available from Aldrich Chemical Co or by synthesis.

Tricarboxylic acid chlorides useful in the synthesis of compositions of formula (XXI) and (XXII) wherein m=3 include benzene-1,3,5-tricarbonyl trichloride and cyclohexane-1,3,5-tricarbonyl trichloride, all available from Aldrich Chemical Co. or by synthesis.

Tetracarboxylic acid chlorides useful in the synthesis of compositions of formula (XXI) and (XXII) wherein m=4 include benzene-1,2,4,5-tetracarbonyl tetrachloride and cyclohexane-1,2,4,5-tetracarbonyl tetrachloride, each available by synthesis.

Alternatively compositions of formula (XXI) and (XXII) wherein m=4 can be provided by condensation of tetracarboxylic acid dianhydrides with two equivalents of the of amino esters (VI) and amino amides (VII), respectively, to provide intermediate ester acids (XXV) and amide acids (XXVI); followed by coupling of the acids with two equivalents of the of amino esters (VI) and amino amides (VII), respectively, as illustrated in Scheme 5.

Tetracarboxylic acid dianhydrides useful in the synthesis of compositions of formula (XXXIII) and (XXXIV) include cyclobutane-1,2,3,4-tetracarboxylic dianhydride, 1,2,4,5-cyclohexanetetracarboxylic dianhydride, and pyromellitic dianhydride, available from Aldrich Chemical Co. or by synthesis.

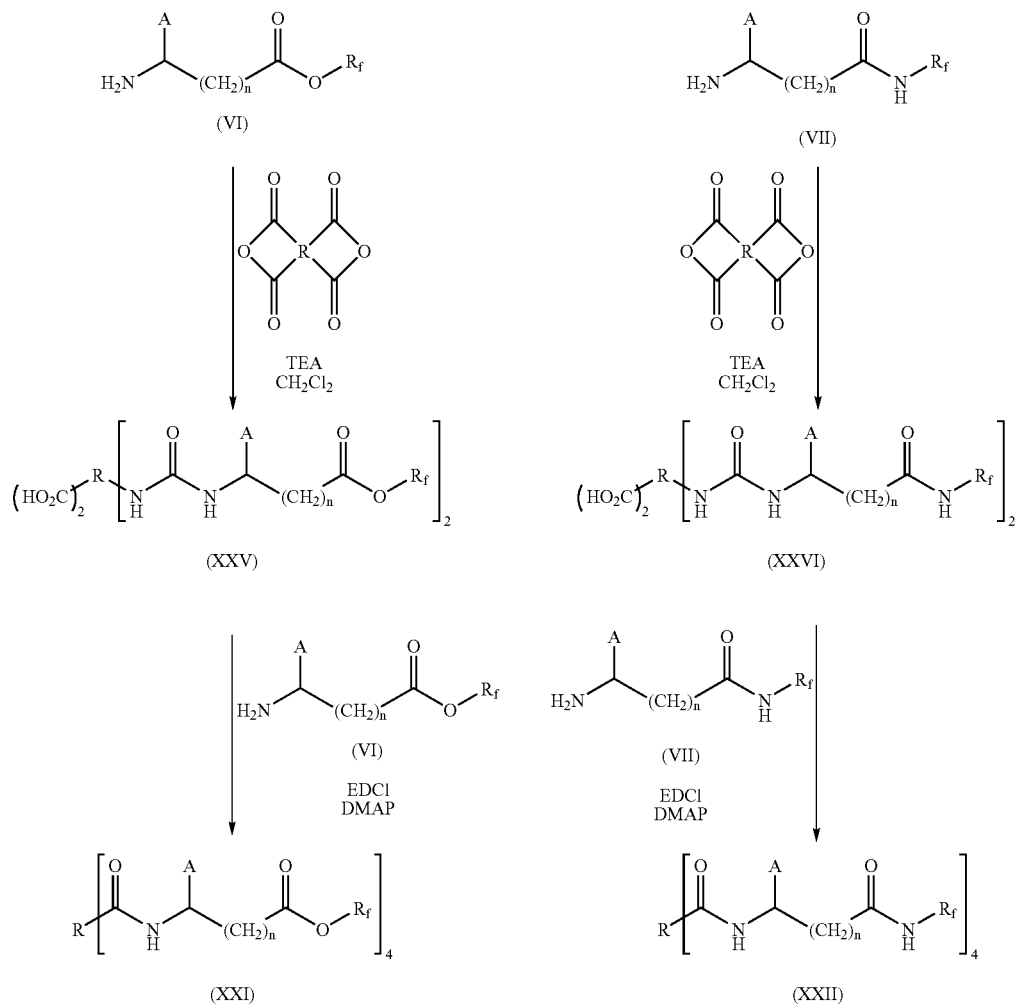

Scheme 5

Condensation with Alcohols

Other embodiments include compositions of formula (XXXI) and (XXXII) as illustrated in scheme 6, useful as organogelators and/or surface active agents. Compositions of formula (XXXI) are defined by formula (I) with m=1 to 4, d=0, B=—O—, Y=—O—, and A, $R_f$, R, and n defined as above. Compositions of formula (XXXI) can be provided by reaction of amino esters (VI) with triphosgene to provide the corresponding isocyanate (XXXIII); followed by condensation of the isocyanate with an alcohol or polyol represented by R(OH)$_m$, wherein m=1 to 4. Compositions of formula (XXXII) are defined by formula (I) with m=1 to 4, d=0, B=—O—, Y=—NH—, and A, R$_f$, R, and n defined as above. Compositions of formula (XXXII) can be provided by reaction of amino amides (VII) with ethyl chloroformate and trimethylsilyl chloride (TMSCl) to provide the corresponding isocyanate (XXXIV) followed by condensation of the isocyanate with an alcohol or polyol corresponding to R(OH)$_m$, wherein m=1 to 4.

erably with a weight average molecular weight (M$_w$) of about 200 to 1250. The mPEG-OH include related alkyl ethers of structure R$^7$O—(CH$_2$CH$_2$O)$_{n1}$—CH$_2$CH$_2$OH wherein R$^7$ is a simple alkyl residue and n1=about 5 to 20 and preferably 10 to 20. The mPEG-PPG-PEG-OH include related alkyl ethers of structure R$^7$O—(CH$_2$CH$_2$O)$_{n1}$—(CH$_2$CH(CH$_3$)O)$_{n1}$—(CH$_2$CH$_2$O)$_{n1}$—CH$_2$CH$_2$OH wherein R$^7$ is a simple alkyl residue and n1=about 2 to 5. Monoalkyl ethers of random copolymers of ethylene oxide and propylene oxide include R$^7$O—(CH$_2$CH$_2$O)$_{n1}$—(CH$_2$CH(CH$_3$)O)$_{n1}$—CH$_2$CH$_2$OH wherein R$^7$ is a simple alkyl residue and n1=about 2 to 10 and Scheme 6

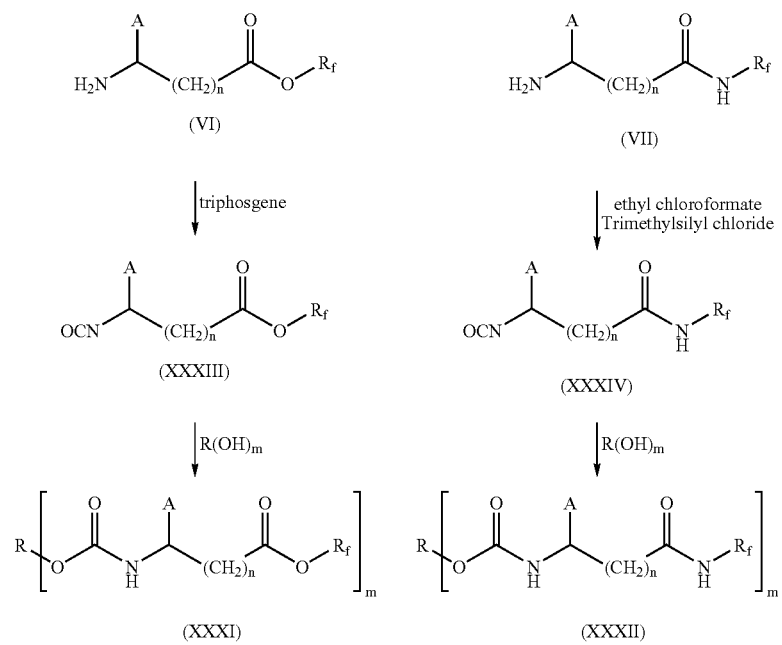

Preferred embodiments include compositions of formula (XXXI) and (XXXII), wherein R is a linear or branched alkyl group of about 6 to about 20 carbon atoms, and more preferably about 10 to 20 carbon atoms.

Other preferred embodiments include compositions of formula (XXXI) and (XXXII), wherein R is a linear or branched alkyl group of about 10 to about 60 carbon atoms, and more preferably about 20 to 40 carbon atoms, interrupted by about 5 to about 30 ether oxygen atoms, wherein the ratio of ether oxygen atoms to carbon atoms is about 1:2 to about 1:4; more preferably about 1:2 to about 1:3. Within these compositions, preferably the R group has a molecular weight, when each valency is occupied by an —OH group, of about 200 to about 1250. These materials are provided from hydroxy terminated polyoxyalkylenes having 1 to 4 hydroxy terminal groups according to Scheme 6.

Alcohols useful in the synthesis of compositions of formula (XXXI) and (XXXII), wherein m=1, include C1 to C20 straight and branched chain alcohols optionally having one or two double bonds; polyethylene glycol monomethyl ethers (mPEGOH), preferably having about 5 to about 20 repeat units, and more preferably about 10 to 20 repeat units; polyethylene glycol-polypropylene glycol-polyethylene glycol triblock monomethyl ethers (mPEG-PPG-PEG-OH) and random copolymers of ethylene oxide and propylene oxide, preferably 5 to 10. Examples include the monobutyl ether of random PEG-PPG with number average molecular weight (M$_n$) of about 970 available from Aldrich Chemical Co. Examples of mPEGOHs are polyethylene glycol methyl ethers M$_n$ with about 350, 550, and 750, available from Aldrich Chemical Co.

Diols useful in the synthesis of compositions of formula (XXXI) and (XXXII), wherein m=2, include C2 to C20 straight and branched chain alcohols optionally having one or two double bonds; polyethylene glycols [PEG(OH)$_2$], preferably having about 5 to about 20 repeat units, and more preferably about 10 to 20 repeat units; polyethylene glycol-polypropylene glycol-polyethylene glycol triblock polymers [PEG-PPG-PEG-(OH)$_2$], and random copolymers of ethylene oxide and propylene oxide, preferably with a M$_w$ of about 200 to 1250. Polyethylene glycols with nominal molecular weights of 200 to 2000 range are available from Aldrich Chemical Co. Tri-block copolymers of polyethylene oxide and polypropylene oxide (PEG-PPG-PEG) are available from BASF, Mount Olive, N.J.

Triols useful in the synthesis of compositions of formula (XXXI) and (XXXII), wherein m=3, include those selected from the group consisting of: glycerol, trimethylol propane, and 3-arm hydroxy terminated polyoxyalkylenes.

Tetraols useful in the synthesis of compositions of formula (XXXI) and (XXXII), wherein m=4, include those selected from the group consisting of: pentaerythritol, and 4-arm hydroxy terminated polyoxyalkylenes.

Compositions with D=1

Other embodiments include compositions of formula (XL) and (XLI), illustrated in Scheme 7, and useful as polymerizable organogelators and/or surface active agents. These structures are defined by formula (I) with m=1, d=1, B=—NH—, and P, A, Y, $R_f$, R, and n defined as above. Compositions of formula (XL) and (XLI) can be provided by condensation of a functionalized monoisocyanate, represented by P—R—N=C=O, with one equivalent of amino esters (VI) and amino amides (VII), respectively.

Preferred compositions with d=1, are those wherein R is a divalent group having 2 to 10 carbons selected from the group consisting of: linear or branched alkyl groups. Specific compounds represented by P—R—N=C=O useful in preparing preferred compositions of formula (XL) and (XLI) include 2-isocyanatoethyl methacrylate, 2-isocyanatoethyl acrylate, 3-isopropenyl-α,α-dimethylbenzyl isocyanate, and 3-(trimethoxysilyl)propyl isocyanate.

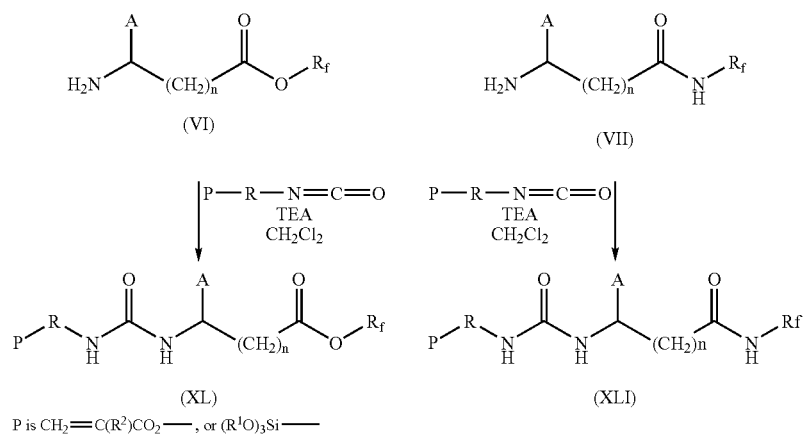

Scheme 7

Other embodiments include compositions of formula (XLII) and (XLIII), illustrated in Scheme 8, and useful as polymerizable organogelators and/or surface active agents. These structures are defined by formula (I) with m=1, d=1, B=—O—, and P, A, Y, $R_f$, R, and n defined as above. Compositions of formula (XLII) and (XLIII) can be provided by condensation of a hydroxyalkyl (meth)acrylate and the like, wherein $R^2$ is as defined above, with isocyanates of formula (X) and (XI), respectively.

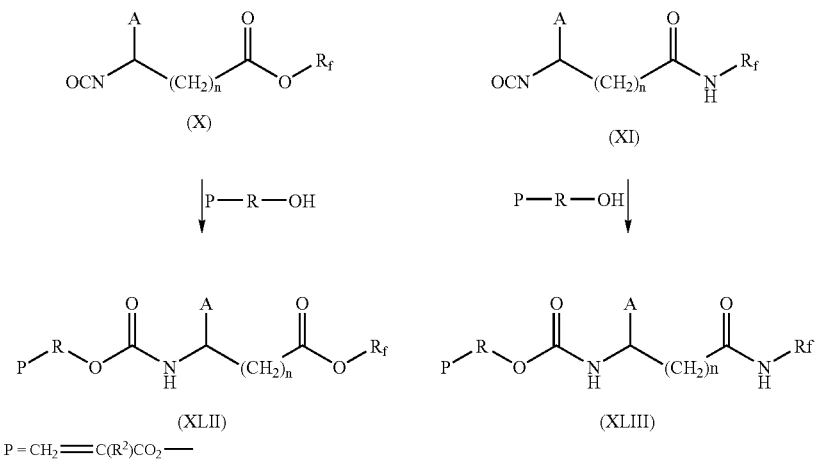

Scheme 8

Preferred compositions with d=1, are those wherein R is a divalent group having 2 to 10 carbons selected from the group consisting of: linear or branched alkyl groups. Specific compounds represented by P—R—N=C=O useful in preparing preferred compositions of formula (XL) and (XLI) include 2-isocyanatoethyl methacrylate, 2-isocyanatoethyl acrylate, 3-isocyanatopropyltriethoxysilane, and 3-isocyanatopropyltrimethoxysilane. Specific compounds represented by P—R—OH useful in preparing preferred compositions of formula (XLII) and (XLIII) include 2-hydroxyethyl methacrylate and 2-hydroxyethyl acrylate.

Partially Fluorinated Alcohols

Partially fluorinated triazole alcohols used in the synthesis of amino esters of formula (VI) can be provided by dipolar cycloaddition reaction of fluoroalkyl alkyl azides with terminal hydroxy alkynes as illustrated in the following scheme.

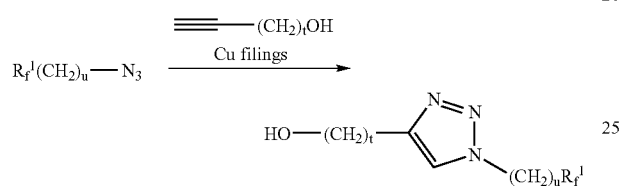

Partially fluorinated vinylidene alcohols (LIII) useful in various embodiments of the invention are available by synthesis according to Scheme 9.

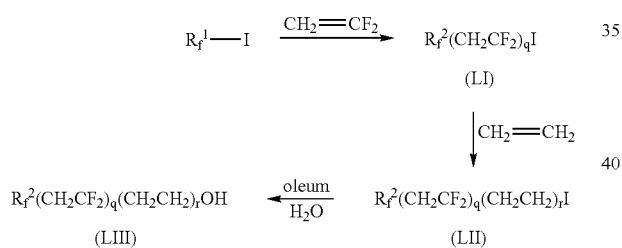

The telomerization of vinylidene fluoride (VDF) with linear or branched perfluoroalkyl iodides is well known, and produces compounds of the structure $R_f^2(CH_2CF_2)_qI$, wherein, q is 1 to 3 or more and $R_f^2$ is a $C_1$ to $C_6$ perfluoroalkyl group. For example, see Balague, et al, "Synthesis of fluorinated telomers, Part 1, Telomerization of vinylidene fluoride with perfluoroalkyl iodides", J. Flourine Chem. (1995), 70(2), 215-23. The specific telomer iodides (LI) are isolated by fractional distillation. The telomer iodides (LI) can be treated with ethylene by procedures described in U.S. Pat. No. 3,979,469, (Ciba-Geigy, 1976) to provide the telomer ethylene iodides (LII) wherein r is 1 to 3 or more. The telomer ethylene iodides (LII) can be treated with oleum and hydrolyzed to provide the corresponding telomer alcohols (LIII) according to procedures disclosed in WO 95/11877 (Elf Atochem S.A.). The higher homologs (r=2, 3) of telomer ethylene iodides (LII) are available with excess ethylene at high pressure.

Specific partially fluorinated vinylidene alcohols derived from telomerization of vinylidene fluoride and ethylene and useful in the invention are listed in Table 1A.

TABLE 1A

| Compound No. | Structure |
|---|---|
| A1 | $C_2F_5$—$CF_2$—CH$_2$CH$_2$—OH |
| A2 | $C_2F_5$—($CF_2$)$_2$—CH$_2$CH$_2$—OH |
| A3 | $C_2F_5$—($CF_2$)$_3$—CH$_2$CH$_2$—OH |
| A4 | $C_2F_5$—$CF_2$—($CH_2CH_2$)$_2$—OH |
| A5 | $C_2F_5$—($CF_2$)$_2$—($CH_2CH_2$)$_2$—OH |
| A6 | $C_4F_9$—$CF_2$—CH$_2$CH$_2$—OH |
| A7 | $C_4F_9$—($CF_2$)$_2$—CH$_2$CH$_2$—OH |
| A8 | $C_4F_9$—($CF_2$)$_3$—CH$_2$CH$_2$—OH |
| A9 | $C_4F_9$—$CF_2$—($CH_2CH_2$)$_2$—OH |
| A10 | $C_4F_9$—($CF_2$)$_2$—($CH_2CH_2$)$_2$—OH |
| A11 | $C_6F_{13}$—$CF_2$—CH$_2$CH$_2$—OH |
| A12 | $C_6F_{13}$—($CF_2$)$_2$—CH$_2$CH$_2$—OH |
| A13 | $C_6F_{13}$—($CF_2$)$_3$—CH$_2$CH$_2$—OH |
| A14 | $C_6F_{13}$—$CF_2$—($CH_2CH_2$)$_2$—OH |
| A15 | $C_6F_{13}$—($CF_2$)$_2$—($CH_2CH_2$)$_2$—OH |

Perfluoroalkyl ether alcohols (LV) useful in various embodiments of the invention are available by synthesis according to Scheme 10.

Scheme 10

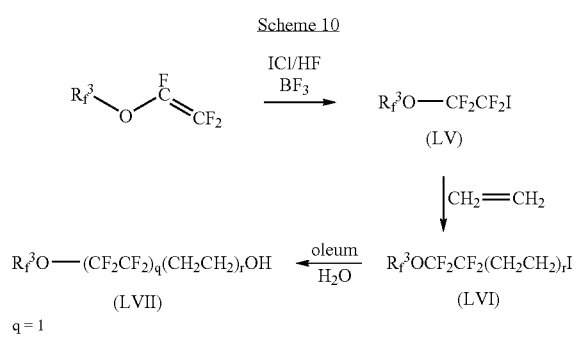

The starting perfluoroalkyl ether iodides can be made by the procedure described in U.S. Pat. No. 5,481,028, herein incorporated by reference, in Example 8, which discloses the preparation of compounds of formula (LV) starting with perfluoroalkyl vinyl ethers. In the second reaction above, the perfluoalkyl ether iodide (LV) is reacted with an excess of ethylene at an elevated temperature and pressure. While the addition of ethylene can be carried out thermally, the use of a suitable catalyst is preferred. Preferably the catalyst is a peroxide catalyst such as benzoyl peroxide, isobutyryl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time may vary with the catalyst and reaction conditions, but we have found 24 hours (h) to be adequate. The product may be purified by any method that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 h, and purifying the product by distillation.

The perfluoroalkyl ether ethylene iodides (LVI) can be treated with oleum and hydrolyzed to provide the corresponding alcohols (LVII) according to procedures disclosed in WO 95/11877. Alternatively, the perfluoroalkylether ethyl iodides can be treated with N-methyl formamide followed by ethyl alcohol/acid hydrolysis. The higher homologs (r=2, 3) of telomer ethylene iodides (LVI) are available with excess ethylene at high pressure.

Specific perfluoroalkyl ether alcohols useful in forming compounds of the invention include those listed in Table 1B

TABLE 1B

| Compound No. | Structure |
|---|---|
| B1 | $F_3C\text{-}O\text{-}CF_2\text{-}CF_2\text{-}CH_2CH_2\text{-}OH$ |
| B2 | $F_3C\text{-}O\text{-}(CF_2CF_2)_2\text{-}CH_2CH_2\text{-}OH$ |
| B3 | $C_2F_5\text{-}O\text{-}CF_2\text{-}CF_2\text{-}CH_2CH_2\text{-}OH$ |

TABLE 1B-continued

| Compound No. | Structure |
|---|---|
| B4 | $C_2F_5\text{-}O\text{-}(CF_2CF_2)_2\text{-}CH_2CH_2\text{-}OH$ |
| B5 | $C_3F_7\text{-}O\text{-}CF_2\text{-}CF_2\text{-}CH_2CH_2\text{-}OH$ |
| B6 | $C_3F_7\text{-}O\text{-}(CF_2CF_2)_2\text{-}CH_2CH_2\text{-}OH$ |
| B7 | $C_4F_9\text{-}O\text{-}CF_2\text{-}CF_2\text{-}CH_2CH_2\text{-}OH$ |
| B6 | $C_4F_9\text{-}O\text{-}(CF_2CF_2)_2\text{-}CH_2CH_2\text{-}OH$ |
| B9 | $C_6F_{13}\text{-}O\text{-}CF_2\text{-}CF_2\text{-}CH_2CH_2\text{-}OH$ |
| B10 | $C_6F_{13}\text{-}O\text{-}(CF_2CF_2)_2\text{-}CH_2CH_2\text{-}OH$ |

Partially Fluorinated Primary Amines

Partially fluorinated primary amines used in the synthesis of amino amides of formula (VII) are available by synthesis. For instance, 2-perfluoroalkylethylamines can be provided by conversion of 2-perfluoroalkylethyl iodides to azides, followed by reduction of the azides to primary amines with hydrazine/Raney Ni or sodium borohydride/water, as disclosed by Cambon et al, in J. Fluorine Chem., 69 (1994) 115-11. The alkyl iodides represented by formulas (LII) and (LVI) in Scheme 9 and 10 above, can be treated in a similar manner to provide the corresponding amines. The alkyl terminal amino alkynes can provide partially fluorinated triazole amines according to the following scheme.

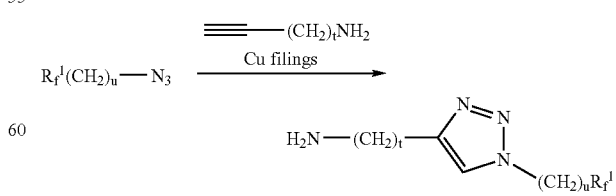

Further embodiments of the invention include compositions of formula (I) wherein when m is 2, 3 or 4, the radicals represented by

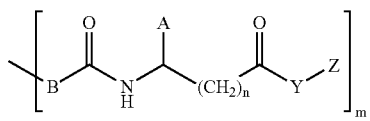

can be the same or different.

Organogelators and Nanoweb Composites

The compounds of various embodiments of the invention are useful as organogelators, i.e. compounds that can self-assemble into fiber-like morphologies. Upon cooling a hot, homogeneous solution of a thermoreversible gelator in a gelling solvent for example, the gelator molecules associate via intermolecular hydrogen bonds to form fibers, which are bundles of H-bonded gelator molecules. If these fibrous bundles grow to be sufficiently long, they become entangled with one another like covalently-linked polymer chains to gel their solvent medium. The solvent can be removed from the gel to leave behind a network of assembled gelator fibers, a "nanoweb". Hence, organogelators can be used to obtain particular surface effects on porous or solid substrates and can be useful in the formation of nanoweb composites. One aspect of the invention is a composite material comprising a porous support and a porous nanoweb, wherein said porous nanoweb comprises fibrous structures of about 10 nm to about 1000 nm effective average fiber diameter as determined with electron microscopy; said fibrous structures comprising one or more compositions of formula (I).

Porous supports useful in the invention include woven and nonwoven fabrics, sheet materials and films, monolithic aggregates, powders, and porous articles such as frits and cartridges. Porous supports include: woven fabrics comprising glass, polyamides including but not limited to polyamide-6,6 (PA-66), polyamide-6 (PA-6), and polyamide-6,10 (PA-610), polyesters including but not limited to polyethylene terephthalate (PET), polytrimethylene terephthalate, and polybutylene terephthalate (PBT), rayon, cotton, wool, silk and combinations thereof; nonwoven materials having fibers of glass, paper, cellulose acetate and nitrate, polyamides, polyesters, polyolefins including bonded polyethylene (PE) and polypropylene (PP), and combinations thereof. Porous supports include nonwovens fabrics, for instance, polyolefins including PE and PP such as TYVEK® (flash spun PE fiber), SONTARA® (nonwoven polyester), and XAVAN® (nonwoven PP), SUPREL®, a nonwoven spunbond-meltblown-spunbond (SMS) composite sheet comprising multiple layers of sheath-core bicomponent melt spun fibers and side-by-side bicomponent meltblown fibers, such as described in U.S. Pat. No. 6,548,431, U.S. Pat. No. 6,797,655 and U.S. Pat. No. 6,831,025, herein incorporated by reference all trademarked products of E.I. du Pont de Nemours and Company; nonwoven composite sheet comprising sheath-core bicomponent melt spun fibers, such as described in U.S. Pat. No. 5,885,909, herein incorporated by reference; other multi-layer SMS nonwovens that are known in the art, such as PP spunbond-PP meltblown-PP spunbond laminates; nonwoven glass fiber media that are well known in the art and as described in Waggoner, U.S. Pat. No. 3,338,825, Bodendorf, U.S. Pat. No. 3,253,978, and references cited therein, hereby incorporated by reference; and KOLON® (spunbond polyester) a trademarked product of Korea Vilene. The nonwovens materials include those formed by web forming processing including dry laid (carded or air laid), wet laid, spunbonded and melt blown. The nonwoven web can be bonded with a resin, thermally bonded, solvent bonded, needle punched, spun-laced, or stitch-bonded. The bicomponent melt spun fibers, referred to above, can have a sheath of PE and a core of polyester. If a composite sheet comprising multiple layers is used, the bicomponent melt-blown fibers can have a PE component and a polyester component and be arranged side-by-side along the length thereof. Typically, the side-by-side and the sheath/core bicomponent fibers are separate layers in the multiple layer arrangement.

Preferred porous supports include woven fabrics comprising glass, polyamides, polyesters, and combinations thereof; and nonwoven fabrics comprising glass, paper, cellulose acetate and nitrate, polyamides, polyesters, polyolefins, and combinations thereof. Most preferred porous supports include nonwoven bonded PE, PP, and polyester, and combinations thereof.

Other preferred nonwoven porous supports include electrospun nanofiber supports such as described by Schaefer, et al., in US 2004/0038014, hereby incorporated by reference; and electro-blown nanofiber supports disclosed in Kim, WO 2003/080905, hereby incorporated by reference. The nanofiber supports can be self-supporting or can be supported by other porous support layers. Preferably, the electrospun fiber supports are nanofiber supports comprising nanofibers with an effective fiber diameter in the range of about 20 nm to about 1 μm, and preferably about 100 nm to about 750 nm. Nanofiber supports useful in the invention include those derived from electro-spinning of polyester, polyamide, cellulose acetate, polyvinylidene fluoride (PVdF), polyacrylonitrile (PAN), polysulfone, polystyrene (PS), and polyvinyl alcohol (PVA). A preferred nanofiber porous support is incorporated into a layered structure comprising one or more other porous supports or scrims, for instance, nonwoven bonded PE or PP, and one or more layers of nanofiber, such as described in U.S. patent application Ser. No. 10/983,513 filed in November 2004, hereby incorporated by reference.

Solid substrates useful for the invention are stone, masonry, concrete, unglazed tile, brick, porous clay, granite, limestone, grout, mortar, marble, wood, gypsum board, terrazzo, or composite materials.

An organogelator is defined herein to include a non-polymeric organic compound whose molecules can establish, between themselves, at least one physical interaction leading to a self-assembly of the molecules in a carrier fluid, with formation of a 3-D network, or a "nanoweb gel", that is responsible for gelation of the carrier fluid. The nanoweb gel may result from the formation of a network of fibrous structures due to the stacking or aggregation of organogelator molecules. Depending on the nature of the organogelator, the fibrous structures have variable dimensions that may range up to one micron, or even several microns. These fibrous structures include fibers, strands and/or tapes.

The term "gelling" or "gelation" means a thickening of the medium that may result in a gelatinous consistency and even in a solid, rigid consistency that does not flow under its own weight. The ability to form this network of fibrous structures, and thus the gelation, depends on the nature (or chemical structure) of the organogelator, the nature of the substituents, the nature of the carrier fluid, and the particular temperature, pressure, concentration, pH, shear conditions and other parameters that may be used to induce gelation of the medium. The nanoweb gels can be reversible. For instance, gels formed in a cooling cycle may be dissipated in a heating cycle. This cycle of gel formation can be repeated a number of times since the gel is formed by physical, non-covalent interactions between gelator molecules, such as hydrogen bonding.

A composition of one embodiment of the invention can be made using a nanoweb gel that comprises a nanoweb phase and a fluid phase, which, upon removal of the fluid, forms a porous interpenetrating nanoweb. The applicants have found that this capability is strongly dependent upon the particular structural characteristics of the organogelator and particular processing parameters including the nature of the solvent, temperature, gelator concentration, method of solvent removal, and the nature of the porous support.

The physical interactions of the organogelators are diverse and may include interactions chosen from hydrogen-bonding interactions, π-interactions between unsaturated rings, dipolar and van der Waals interactions, and coordination bonding with organometallic derivatives. In general, the non-covalent forces are weak compared to covalent bonds, which makes them reversible, and it requires that several of them be combined to form a strong association. For example, as discussed in Goshe, et al. (Proc. Nat. Acad. Sci. USA (2002) 99, 4823), the energy of a covalent C—C bond is 350 kJ/mol, while the energy of a hydrogen bond ranges from 4 to 120 kJ/mol, and that of a π-stack from 4 to 20 kJ/mol. The establishment of these interactions may often be promoted by the architecture of the molecule, such as by one or more heteroatom-hydrogen bonds, aromatic rings, unsaturation, bidentate metal coordination sites, and favorable packing geometries. In general, each molecule of an organogelator can establish several types of physical interaction with a neighboring molecule. Thus, in one embodiment, the organogelator preferably comprises at least one conjugated group capable of establishing at least two hydrogen bonds; at least one group having at least two aromatic rings in conjugation; at least one group having 14-atom aromatic system; or at least one group capable of bidentate coordination with a metal ion.

Solvents and specific conditions for forming gels of many organogelators are available in the patent and scientific literature. However, one skilled in the art will recognize that some gelators may require some preliminary gelling experimentation. For such cases, a methodology has been developed for matching a solvent system with specific gelators to allow efficient gel formation. In general, if the gelator is too soluble, it will dissolve without forming a gel even at high concentrations. If the gelator is not soluble enough, it may or may not dissolve at high temperature, but precipitate again as the temperature is lowered. Ideally, the organogelator should dissolve in a solvent at some temperature and assemble into a network upon cooling. Preferably the gelators have a solubility in a solvent system of about 0.1 to 5 wt % at a temperature/pressure above the gel point. Changing the temperature and/or pressure, adjusting the solvent composition, adjusting the pH, altering the shear-state of thixotropic systems, or a combination of parameters can be used to induce gelling.

For example, a screening protocol for evaluating thermoreversible gels allows evaluation of a specific gelator with different solvents in parallel using a reactor block. In a typical set-up, 2 wt % slurries of the organogelator in solvents of varying polarities can be prepared, for example a series may include: water, n-butanol, ethanol, chloroform, toluene, and cyclohexane. The vials are then placed in a reactor block for 1 h while stirring at a temperature close to the boiling point of the solvent to induce dissolution. In the case of some gelators, for instance, urea-based gelators, additives such as lithium salts, for instance lithium nitrate, can be added in small amounts (0.1 to about 10 wt %, based on the amount of organogelator) as described in U.S. Pat. No. 6,420,466, hereby incorporated by reference. Upon cooling, gelation may occur and is evident by formation of a translucent to opaque appearance without the formation of solid crystals, and/or a significant increase in viscosity. If gelation does not occur, one can screen different solvents or solvent mixtures as well as different additives and additive levels. If a gelator sample is soluble in a given solvent, but organogelation does not occur, then one can either raise the gelator concentration to, for instance, 3 or 5 wt % and repeat the heating cycle, or one can lower the solubility of the compound by using a solvent mixture of lower polarity.

Preferred solvents for H-bonded organogelators are those having H-bonding capability that allows disruption of intermolecular H-bonding between solute molecules. Water, ammonia, alcohols, sulfoxides, esters, ethers, amines, amides, and lactams are useful. H-bonded organogelators often exhibit very high solubility in the lower alcohols such as methanol and ethanol. Whereas H-bonded organogelators often exhibit lesser solubility in the higher aliphatic and cyclic alcohols including propanol, butanol, hexanol, cyclohexanol and isomers thereof, making them more desirable for use as gelating solvents. Specific solvents that are especially useful in forming gelling mixtures include: water, the lower aliphatic and cyclic alcohols such as ethanol, isopropyl alcohol, butanol, hexanol, cyclohexanol, cylopentanol, and octanol; aliphatic and aromatic hydrocarbons such as hexane, cyclohexane, heptane, octane, toluene, xylenes, and mesitylene; amides and lactams such as N-methylpyrrolidone, pyrrolidone, caprolactam, N-methyl caprolactam, dimethyl formamide, and dimethyl acetamide; ethers such as dibutyl ether, dipropyl ether, methyl butyl ether; ether alcohols such as 2-methoxyethanol, 2-butoxyethanol, and others in the class of ethers known as CELLUSOLVES®; esters such as ethyl acetate, butyl acetate and the like; aliphatic and aromatic halocarbons such as dichloromethane, 1,2-dichloroethane, 1,1,1-trichloroethane and dichlorobenzene. Butanol, and especially n-butanol, is a preferred solvent for use in the process of the invention.

The gelling mixture, as applied to a solid or porous support, can be in the form of: a homogeneous isotropic solution; a gel that can be shear-thinned (thixotropic) to form a fluidized gel; or a gel in the form of a film, sheet or powder that can be melted to form a fluidized gel. Formulation of a suitable gelling mixture to depends upon the methods anticipated for applying the gelling mixture and gelling the impregnated or coated support. For instance, in a preferred embodiment the gelling mixture is a gel that can be shear-thinned prior to, or during, application to form a fluidized gel. The fluidized gel can then penetrate a porous support to provide an impregnated support.

In another preferred embodiment the gelling mixture is a homogeneous isotropic solution that, if so desired, is heated above ambient conditions. After applying the solution to provide a coated or impregnated support, the treated support can be cooled to induce gelation. Suitable gelling mixtures preferably comprise 0.01 to 20 wt % of one or more organogelators, and preferably, 0.5 to 5 wt %, with the remainder being solvent and other processing aids, for instance lithium salts.

Applying the gelling mixture to a solid or porous support can be done by a variety of methods including one or more of the steps of: spraying, coating, blading, casting laminating, rolling, printing, dipping, and immersing; and allowing gravity, diffusion, and/or flow through of the gelling mixture into the porous support, and, optionally, applying pressure, heat or vacuum. Spraying, coating, blading, casting and immersing are preferred methods for applying thixotropic gels and spraying and blading are most preferred. Laminating and heating is a preferred method for applying solid gels in the form of films. Spraying, coating, blading, casting, printing and immersing or dipping are preferred methods for applying homogeneous isotropic solutions. In some instances, it is advantageous to remove excess gelling mixture from the surface of a porous support, such as by scraping or the like.

Gelling the treated support can be accomplished by a variety of methods depending upon the nature of the gelling mixture. In one preferred embodiment, wherein the gelling mixture is a thermo-reversible gel, the gelling step comprises cooling of a homogeneous solution of the gelling mixture in the impregnated support. The gelling mixture can be preheated to provide a homogeneous solution or can be cooled from ambient temperature, if so desired. Another preferred embodiment, wherein the gelling mixture is a gel applied with shearing, the gelling step can comprise abating the shearing in the impregnated support. This can be accomplished by allowing the impregnated support to sit for a period of time in the absence of shear. In another embodiment, wherein the gelling mixture is sensitive to pH, the impregnated support can be subjected to a change in pH. In other embodiments the solvent can be modified by addition of a non-solvent in a solvent exchange or partially removed to provide a gel.

Drying the gel, dr removing the solvent from the gel, will leave behind a porous nanoweb on and/or within a solid or porous support. Drying can be achieved through a variety of routes including freeze drying, ambient drying, oven, radiant and microwave heating, vacuum drying (with or without heat), or critical point drying (CPD). Alternatively the solvent can be exchanged with another fluid, in a fluid-fluid extraction process or a supercritical fluid extraction (SFE), which then can be removed from the gel via one of the aforementioned drying techniques, if so desired.

The drying method can have a profound effect on the resultant nanoweb structure as the various drying methods occur over different time scales, place different stresses on the nanoweb structure, and involve the crossing of different phase boundaries.

In vacuum drying, the driving force for solvent removal from the impregnated material is increased such that the solvent can be removed more readily, and thus without disruption of the assembled nanoweb. Heat can be used in combination with vacuum if it does not disrupt the gelled assembly. Ambient drying is performed at atmospheric pressure and optionally with heat. In freeze drying, the coated or impregnated material is rapidly frozen (on a time scale that does not allow for rearrangement of the gel structure) and solvent is subsequently sublimed away to provide the nanoweb material.

The porous nanoweb coatings can be characterized by a quantitative estimation of the surface tension relative to that of the support. Surface tension is typically characterized by measuring the contact angle of a water droplet or other liquid substance, contacting the surface in the advancing and receding dynamic modes. Contact angles can also be measured in a static mode. This is a well known method for determining surface properties and is discussed in detail in Physical Chemistry of Surfaces, 4th Ed., Arthur W. Adamson, John Wiley & Sons, 1982, pp. 338-361. The water contact angle is a quantitative measurement of the hydrophobicity of a surface. The higher the hydrophobicity, the higher will be the contact angle of the water droplet. Surfaces exhibiting water droplet advancing contact angles of greater than 150° are considered super-hydrophobic. The details of contact angle measurements are discussed in the examples. Preferred nanoweb coatings of the invention are characterized by water droplet advancing contact angle of greater than 130°. Other preferred coatings of the invention are characterized by a static hexadecane droplet contact angle of about 70° or greater, indicating oleophobicity.

The composite materials of various embodiments of the invention can be used as gas-solid filter. The gas can be air, carbon dioxide, oxygen, nitrogen, a noble gas, or any other process gas used in industrial or commercial processes. Air filters are preferred applications of the composite materials. Filters can be in the form of nonwoven pleated or unpleated cartridge filters, glass or other ceramic microfiber filters.

Since the individual organogelator molecules making up the nanoweb are not covalently bonded to one another, there are conditions in which the porous nanoweb can be easily dissolved and removed from the porous support. In applications wherein trapped material is of significant interest, for instance, biological material, radioactive material, etc., the solubility of the nanoweb is a particular advantage, as it can allow release and recovery of the trapped material. Such flexibility can be useful in recycling and recovery of composite materials as well.

The composite materials of various embodiments may also find use in barrier fabric applications, such as for protective clothing or construction wrap, in which good barrier against liquid penetration is provided while maintaining good air and moisture vapor permeability.

These examples are illustrative and are not to be read as limiting the scope of the invention as it is defined by the appended claims.

Materials and Methods

All solvents and reagents, unless otherwise indicated, were purchased from commercial sources and used directly as supplied. 1H,1H,2H,2H-perfluorooctyl amine and 1H, 1H,2H,2H-perfluorohexylamine were synthesized from corresponding iodides via the azide followed by reduction using Raney Ni as described in the literature procedure (Cambon, et al., *J. Fluorine. Chem.*, 1994, 69, 115-117). $^1$H and $^{19}$F NMR spectra were recorded on a Brucker DRX 400 or 500 Spectrometer. Chemical shifts have been reported in ppm relative to an internal reference ($CDCl_3$, $CFCl_3$ or TMS). All melting points reported are uncorrected.

C4-Triazole-OH

Sodium azide (312.0 g, 4.81 mol) and tetrabutylammonium bromide (29.6 g, 0.032 mol) were dissolved in 500 mL of water and transferred to a 3000-mL reactor. To this was added 1,1,1,2,2,3,3,4,4-nonafluoro-6-iodohexane (1500 g) and the reaction mixture was stirred vigorously at 95±5° C. until the reaction was determined complete by GC. After all the 1,1,1,2,2,3,3,4,4-nonafluoro-6-iodohexane was consumed, the reaction mass was cooled, filtered and the solute was washed five times with 100-mL portions of deionized water to remove residual sodium azide. The solution was dried over magnesium sulfate and distilled under vacuum to yield 6-azido-1,1,1,2,2,3,3,4,4-monafluorohexane as a clear liquid in 52% yield and purity of 99%.

To a round bottom flask, 6-azido-1,1,1,2,2,3,3,4,4-nonafluorohexane (50.0 g, 0.17 mol) of Example 7, propargyl alcohol (9.5 g, 0.17 mol) and 0.5 g of copper turnings were added and stirred vigorously for 12 hours. The completion of the reaction was confirmed by the transformation of the liquid reaction mixture into a white solid. The crude product was dissolved in methanol (50 mL) and flashed through silica gel, using methanol as an eluent. The methanol was removed via vacuum to yield (1-(3,3,4,4,5,5,6,6,-nonafluorohexyl)-1H-1, 2,3-triazol-4-yl)methanol (C4-Triazole-OH) as a white powder in 90% yield and with high purity (98%).

Compound A6

Ethylene (25 g) was introduced to an autoclave charged with $C_4F_9CH_2CF_2I$ (217 g) and d-(+)-limonene (1 g), and the reactor heated at 240° C. for 12 h. The product was isolated by vacuum distillation to provide $C_4F_9CH_2CF_2CH_2CH_2I$.

Fuming sulfuric acid (70 mL) was added slowly to 50 g of $C_4F_9CH_2CF_2CH_2CH_2I$ and mixture stirred at 60° C. for 1.5 h. The reaction was quenched with ice-cold 1.5 wt % $Na_2SO_3$ aqueous solution and heated at 95° C. for 0.5 h. The bottom layer was separated and washed with 10 wt % aqueous sodium acetate, and distilled to provide 3,3,5,5,6,6,7,7,8,8,8-undecafluorooctan-1-ol (compound A6): bp 54-57° C. at 2 mmHg.

EXAMPLE 1

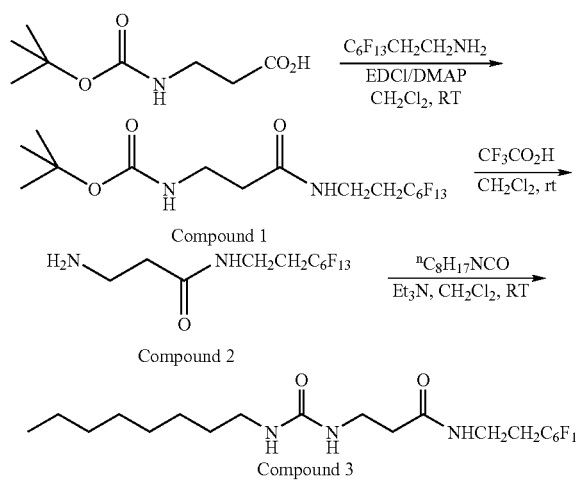

This example illustrates the synthesis of compounds 1 and 3.

A mixture of dichloromethane (250 mL), N-BOC-β-alanine (5.67 g, 30.0 mmol), 1-[3-(dimethylamino)propyl]-3-ethylcarbodiimide hydrochloride (EDCl) (5.75 g, g, 30.0 mmol) and 4-(dimethylamino)pyridine (3.66 g, 30.0 mmol) was stirred for 10 min at room temperature (RT) followed by addition of 1H,1H,2H,2H-perfluorooctylamine (11.2 g, 31.0 mmol) via the addition funnel. The mixture was stirred for 12 h at RT. The mixture was washed with 2% HCl (2×60 mL), saturated $NaHCO_3$ solution (1×50 mL) and brine (1×50 mL). The resulting organic layer was dried ($MgSO_4$) and concentrated to provide compound 1 (15.1 g, 28.4 mmol, 94%): Mp 107-108° C.; $^1H$ NMR (acetone-d6): δ 6.25 (bs, 1H), 5.09 (bs, 1H), 3.61 (q, J=6.8 Hz, 2H), 3.42 (q, J=5.8 Hz, 2H), 2.44 (t, J=6.8 Hz, 2H), 2.37 (m, 2H), 1.45 (s, 9H): $^{19}F$ NMR (acetone-d6): δ −81.2 (m, 3F), −114.3 (m, 2F), −122.2 (s, 2F), −123.2 (s, 2F), −124.0 (s, 2F), −126.5 (m, 2F).

A suspension of compound 1 (14.5 g, 27.1 mmol) in dichloromethane (50 mL) was stirred with trifluoroacetic acid (TFA) (24.7 g, 217.2 mmol) at RT for 3 h. Chloroform (50 mL) was added and the bulk of the solvents and TFA evaporated under vacuum. The resulting trifluoro acetate salt was stirred with saturated $NaHCO_3$ solution (200 mL) and the solid formed was filtered. The residue was washed with cold water and dried under vacuum to provide compound 2 (9.1 g, 20.9 mmol, 77%): Mp 115-117° C.

To a mixture of compound 2 (4.34 g, 10.0 mmol), dichloromethane (50 mL) and triethyl amine (0.05 g, 0.5 mmol) under a $N_2$ purge was added n-octyl isocyanate (1.55 g, 10.0 mmol) and the mixture stirred for 5 h at RT. The solid product was filtered and washed with cold hexanes (2×5 mL) to provide compound 3 (5.29 g, 9.0 mmol, 90%): Mp 149-151° C.; $^1H$ NMR (acetone-d6 @ 50° C.): δ 7.27 (bs, 1H), 5.33 (bs, 2H), 3.40 (q, J=6.0 Hz, 2H), 3.23 (q, J=6.4 Hz, 2H), 2.96 (q, J=6.0 Hz, 2H), 2.36 (m, 2H), 2.20 (t, J=6.4 Hz, 2H), 1.30 (m, 2H), 1.16 (m, 10H), 0.74 (t, J=6.8 Hz, 3H): $^{19}F$ NMR (acetone-d6 @ 50° C.): 6-82.1 (m, 3F), −114.7 (m, 2F), −122.6 (s, 2F), −123.6 (s, 2F), −124.4 (s, 2F), −126.9 (m, 2F).

EXAMPLE 2

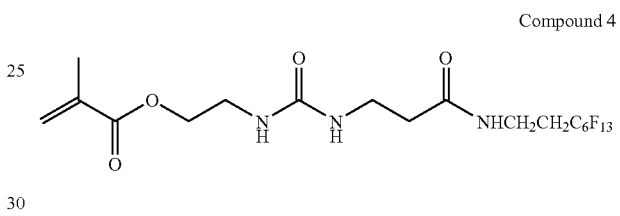

This example illustrates the synthesis of compound 4.

By using a similar procedure as described in Example 1, reaction of compound 2 (4.0 g, 9.21 mmol), with 2-isocyanatomethacrylate (1.4 g, 9.21 mmol) provided compound 4 (5.05 g, 8.57 mmol, 93%): Mp 116-117.5° C.; $^1H$ NMR (Acetone-d6): δ 7.34 (bs, 1H), 5.94 (s, 1H), 5.70 (bt, 1H), 5.54 (bt, 1H), 5.46 (m, J=1.6 Hz, 1H), 4.00 (t, J=6.0 Hz, 2H), 3.39 (q, J=6.4 Hz, 2H), 3.28 (q, J=5.8 Hz, 2H), 3.22 (q, J=6.0 Hz, 2H), 2.32 (m, 2H), 2.21 (t, J=6.4 Hz, 2H), 1.77 (t, J=1.2 Hz, 3H): $^{19}F$ NMR (acetone-d6): δ −82.1 (m, 3F), −115.0 (m, 2F), −122.8 (s, 2F), −123.8 (s, 2F), −124.5 (s, 2F), −127.1 (m, 2F).

EXAMPLE 3

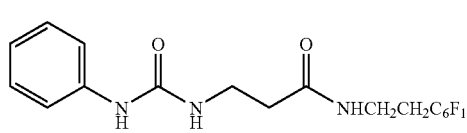

This example illustrates the synthesis of compound 5.

By using a similar procedure as described in Example 1, reaction of compound 2 (2.17 g, 5.0 mmol), with phenyl isocyanate (0.595 g, 5.0 mmol) provided compound 5 (2.52 g, 4.55 mmol, 91%): Mp 175-177° C.; $^1H$ NMR (acetone-d6): δ 7.91 (bs, 1H), 7.35 (d, J=7.6 Hz, 2H), 7.06 (tm, J=7.2 Hz, 2H), 6.74 (tm, J=7.2 Hz, 1H), 5.81 (bs, 2H), 3.42 (q, J=6.4 Hz, 2H), 3.31 (q, J=6.4 Hz, 2H), 2.35 (m, 2H), 2.26 (t, J=6.8 Hz, 2H):

$^{19}$F NMR (acetone-d6): δ −82.1 (m, 3F), −115.0 (m, 2F), −122.8 (s, 2F), −123.8 (s, 2F), −124.5 (s, 2F), −127.1 (m, 2F).

EXAMPLE 4

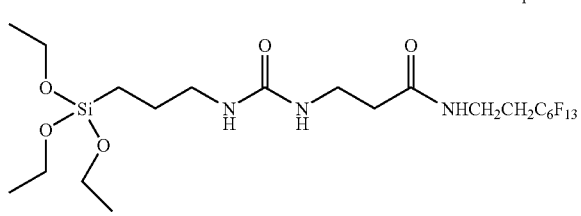

Compound 6

This example illustrates the synthesis of compound 6.

By using a similar procedure as described in Example 1, reaction of compound 2 (3.47 g, 8.0 mmol), with 3-isocyanatopropyltriethoxysilane (0.9896 g, 4.0 mmol) provided compound 6 (5.1 g, 7.48 mmol, 94%): Mp 77–81° C.: $^1$H NMR (CDCl$_3$): δ 6.75 (t, J=5.6 Hz, 1H), 5.15 (t, J=6.4 Hz, 1H), 4.80 (t, J=5.6 Hz, 1H), 3.83 (q, J=7.2 Hz, 6H), 3.60 (q, J=6.8 Hz, 2H), 3.50 (q, J=5.6 Hz, 2H), 3.14 (q, J=6.0 hz, 2H), 2.40 (t, J=6.0 Hz, 2H), 2.37 (m, 2H), 1.62 (quintet, J=7.2 Hz, 2H), 1.24 (t, J=7.2 Hz, 9H), 0.646 (t, J=8.0 Hz, 2H): $^{19}$F NMR (CDCl$_3$): δ −81.2 (m, 3F), −114.4 (m, 2F), −122.3 (s, 2F), −123.3 (s, 2F), 124.0 (s, 2F), −126.6 (m, 2F).

EXAMPLE 5

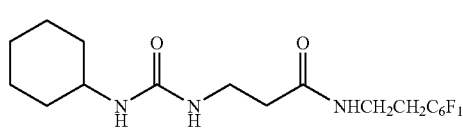

Compound 7

This example illustrates the synthesis of compound 7.

By using a similar procedure as described in Example 1, reaction of compound 2 (2.17 g, 5.0 mmol), with cyclohexyl isocyanate (0.625 g, 5.0 mmol) provided compound 7 (2.05 g, mmol, 3.66 mmol, 73%): Mp 164-165.5° C.; $^1$H NMR (DMF-d7): 8.30 (bs, 1H), 6.09 (d, J=8.0 Hz, 2H), 6.03 (t, J=5.6 Hz, 1H), 3.66 (q, J=7.2 Hz, 2H), 3.54 (q, J=6.4 Hz, 2H), 2.69 (m, 2H), 2.53 (t, J=6.4 Hz, 2H), 1.99 (m, 2H), 1.83 (m, 2H), 1.72 (m, 1H), 1.42 (m, 2H), 1.29 (m, 2H): $^{19}$F NMR (DMF-d7): δ −83.5 (m, 3F), −116.4 (m, 2F), −124.4 (s, 2F), −125.3 (s, 2F), 126.1 (s, 2F), −128.6 (m, 2F).

EXAMPLE 6

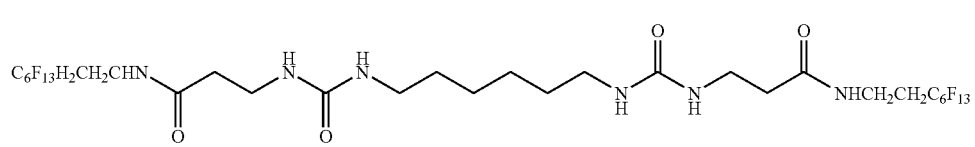

Compound 8

This example illustrates the synthesis of compound 8.

By using a similar procedure as described in example 1, reaction of compound 2 (3.47 g, 8.0 mmol), with 1,6-diisocyanatohexane (0.672 g, 4.0 mmol) provided compound 8 (3.75 g, 3.62 mmol, 91%: Mp 223-227° C.; $^1$H NMR (DMF-d7, 100° C.): δ 7.74 (bs, 2H), 5.71 (bs, 4H), 3.58 (q, J=Hz, 4H), 3.42 (q, J=Hz, 4H), 3.14 (q, J=Hz, 4H), 2.58 (m, 4H), 2.41 (t, J=Hz, 4H), 1.48 (m, 4H), 1.39 (m, 4H): $^{19}$F NMR (DMF-d7, 100° C.): 6-86.7 (s, 6F), −118.6, s, 4F), −126.9 (s, 4F), −127.8 (s, 4F), −128.7 (s, 4F), −131.1 (s, 4F).

EXAMPLE 7

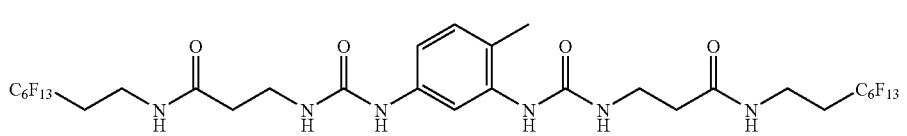

Compound 9

This example illustrates the synthesis of compound 9.

By using a similar procedure as described in example 1, reaction of compound 2 (1.085 g, 2.5 mmol), with tolylene-2,4-diisocyanate (0.218 g, 1.25 mmol) provided compound 9 (1.06 g, 1.02 mmol, 81%).

EXAMPLE 8

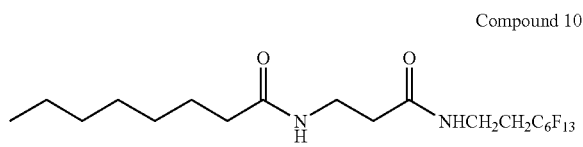

Compound 10

This example illustrates the synthesis of compound 10.

To a mixture of compound 2 (3.0 g, 6.91 mmol), dichloromethane (30 mL) and triethyl amine (0.769 g, 7.6 mmol) under a $N_2$ purge was added n-octanoyl chloride (1.12 g, 6.91 mmol) and the mixture stirred for 12 h at RT. The solid product formed was dissolved in ethyl acetate (150 mL) and washed the organic layer with 2% HCl (1×50 mL), sat. $NaHCO_3$ (1×50 mL) and brine (1×50 mL). The resulting organic layer was dried ($MgSO_4$) and concentrated to provide compound 10 (2.14 g, 3.82 mmol, 55%): Mp 102-103.5° C.; $^1$H NMR (acetone-d6) δ 7.30 (bs, 1H), 6.90 (bs, 1H), 3.40 (q, J=6.4 Hz, 2H), 3.26 (q, J=6.8 Hz, 2H), 2.35 (m, 2H), 2.22 (t, J=6.4 Hz, 2H), 2.14 (t, J=7.4 Hz, 2H), 1.44 (m, 2H), 1.16 (m, 8H), 0.75 (t, distorted J=6.8 Hz.) $^{19}$F NMR (acetone-d6): δ −84.1 (m, 3F), −117.0, m, 2F), −124.8 (s, 2F), −125.8 (s, 2F), −126.1 (s, 2F), −129.2 (m, 2F).

EXAMPLE 9

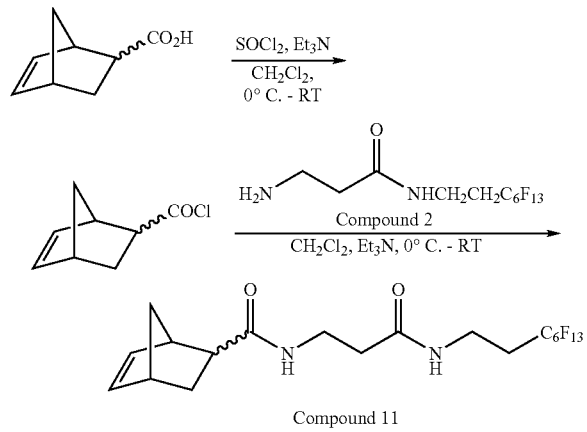

Compound 11

This example illustrates the synthesis of compound 11.

To a solution of 5-norbornene-2-carboxylic acid (mixture of exo- and endo-isomers) (1.1 g, 7.7 mmol) in anhydrous dichloromethane (20 mL) was added triethyl amine triethylamine (1.1 mL, 7.7 mmol) under $N_2$ atmosphere. The mixture cooled to −10° C. and then added slowly a solution of thionyl chloride (0.56 mL, 7.7 mmol) in anhydrous dichloromethane (2 mL), maintaining <0° C. After the addition is complete, the reaction mixture was stirred at RT for 1 hour. This was designated Pot 1.

By using a similar procedure as described in example 8, to a solution of compound 2 (2.8 g, 6.4 mmol) in anhydrous dichloromethane (50 mL) and triethylamine (0.9 mL, 6.4 mmol) was added dropwise the contents from Pot 1 at 0° C. via an addition funnel. The pale yellow reaction mixture was stirred at RT for 2 days and quenched with ice-water mixture (~200 g). Work-up using chloroform (200 mL) instead ethyl acetate in example 8 provided compound 11 as a pale yellow solid (3.2 g, 5.82 mmol, 91%). Trituration of this solid with dichloromethane provided compound 11 as a white solid (0.6 g).

EXAMPLE 10

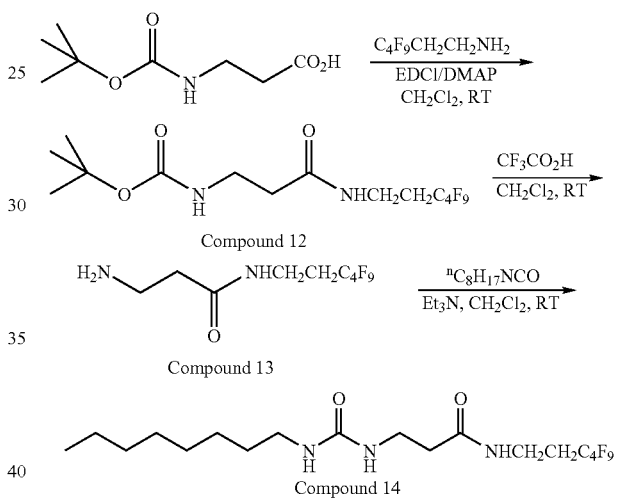

This example illustrates the synthesis of compound 12 and 14.

By using a similar procedure as described in example 1, reaction of N-BOC-β-alanine (8.5 g, 45.0 mmol) with 1H,1H, 2H,2H-perfluorohexylamine (11.8 g, 45.0 mmol) provided compound 12 (16.9 g, 21.6 mmol, 87%): Mp 135-136.5° C.; $^1$H NMR (acetone-d6): δ 7.25 (bs, 1H), 5.76 (bs, 1H), 3.41 (q, J=6.8 Hz, 2H), 3.16 (q, J=6.4 Hz, 2H), 2.32 (m, 2H), 1.42.24 (t, J=7.2 Hz, 2H), 1.26 (s, 9H): $^{19}$F NMR (acetone-d6): δ−82.4 (m, 3F), −115.2 (m, 2F), −125.5 (m, 2F), −127.1 (m, 2F).

By using a similar procedure as described in example 1, compound 12 (16.0 g, 36.8 mmol) was deprotected using trifluoroacetic acid to obtain compound 13 (11.9 g, 35.6 mmol, 97%): Mp 90-92° C.

By using a similar procedure as described in example 1, reaction of compound 13 (3.0 g, 8.98 mmol) with octyl isocyanate (1.39 g, 8.98 mmol) provided compound 14 (3.68 g, 7.5 mmol, 93%): Mp 135-136.5° C.: $^1$H NMR (acetone-d6): δ 3.39 (q, J=7.2 Hz, 2H), 3.22 (q, J=6.4 Hz, 2H), 2.97 (q, J=6.8 Hz, 2H), 2.33 (m, 2H), 2.22 (t, J=6.4 Hz, 2H), 1.32 (m, 2H), 1.19 (m, 10H), 0.77 (t, J=6.8 Hz, 3H): $^{19}$F NMR (acetone-d6): δ −82.4 (m, 3F), −115.3 (m, 2F), −125.5 (m, 2F), −127.1 (m, 2F).

EXAMPLE 11

Compound 15

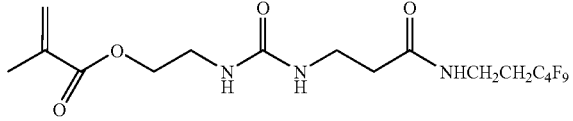

This example illustrates the synthesis of compound 15.

By using a similar procedure as described in example 1, reaction of compound 13 (3.0 g, 8.98 mmol) with 2-isocyanatomethacrylate (0.1.39 g, 8.98 mmol) provided compound 15 (3.9 g. 7.97 mmol, 89%): Mp 94-96° C.: $^1$H NMR (acetone-d6): δ 6.76 (bs, 1H), 6.13 (d, J=1.2 Hz, 1H), 5.60 (m, 1H), 5.47 (bs, 1H), 5.22 (bs, 1H), 4.24 (q, J=5.8 Hz, 2H), 3.59 (q, J=6.4 Hz, 2H), 3.47 (q, J=5.8 Hz, 2H), 3.22 (q, J=6.0 Hz, 2H), 2.45 (t, J=6.4 Hz, 2H), 2.32 (m, 2H), 1.94 (t, J=1.2 Hz, 3H): $^{19}$F NMR (acetone-d6): δ −81.4 (m, 3F), −114.6 (m, 2F), −124.9 (m, 2F), −126.4 (m, 2F).

EXAMPLE 12

Compound 16

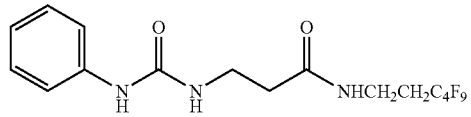

This example illustrates the synthesis of compound 16.

By using a similar procedure as described in Example 1, reaction of compound 13 (2.0 g, 5.98 mmol), with phenyl isocyanate (0.712 g, 5.98 mmol) provided compound 16 (2.03 g, 4.48 mmol, 91%): Mp 169-172° C.; $^1$H NMR (acetone-d6): δ 7.92 (bs, 1H), 7.35 (d, J=7.6 Hz, 2H), 7.06 (tm, J=7.2 Hz, 2H), 6.74 (tm, J=7.2 Hz, 1H), 5.81 (bs, 2H), 3.40 (q, J=6.4 Hz, 2H), 3.30 (q, J=6.4 Hz, 2H), 2.32 (m, 2H), 2.26 (t, J=6.8 Hz, 2H): $^{19}$F NMR (acetone-d6): δ −82.4 (m, 3F), −115.3 (m, 2F), −125.5 (s, 2F), −127.1 (m, 2F).

EXAMPLE 13

Compound 17

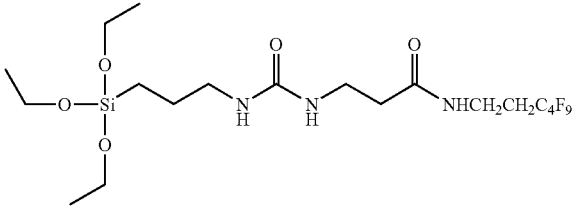

This example illustrates the synthesis of compound 17.

By using a similar procedure as described in Example 1, reaction of compound 13 (1.336 g, 4.0 mmol), with 3-isocyanatopropyltriethoxysilane (0.989 g, 4.0 mmol) provided compound 17 (1.82 g, 3.13 mmol, 78%). $^1$H NMR (CDCl$_3$): δ6.72 (t, J=5.6 Hz, 1H), 5.10 (bs, 1H), 4.75 (bs, 1H), 3.73 (q, J=7.2 Hz, 6H), 3.58 (q, J=6.8 Hz, 2H), 3.47 (q, J=5.6 Hz, 2H), 3.14 (q, J=6.0 Hz, 2H), 2.46 (t, J=6.0 Hz, 2H), 2.38 (m, 2H), 1.62 (m, 2H), 1.24 (t, J=7.2 Hz, 9H), 0.647 (t, J=8.0 Hz, 2H): $^{19}$F NMR (CDCl$_3$): δ −81.5 (m, 3F), −114.6 (m, 2F), −124.9 (m, 2F), −126.4 (m, 2F).

EXAMPLE 14

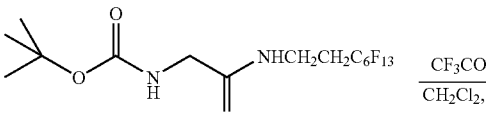

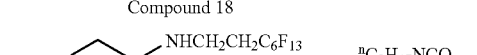

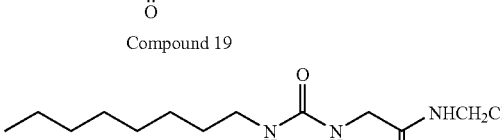

This example illustrates the synthesis of compound 18, and 20.

By using a similar procedure as described in example 1, reaction of N-Boc-Glycine (5.25 g, 30.0 mmol) with 1H,1H, 2H,2H-perfluorooctylamine (11.2 g, 31 mmol) provided compound 18 (10.9 g, 20.9 mmol, 70%): Mp 74-76° C.: $^1$H NMR (acetone-d6): δ 6.57 (bs, 1H), 5.27 (bs,1H), 3.81 (d, J=6.0 Hz, 2H), 3.63 (q, J=6.0 Hz, 2H), 2.37 (m, 2H), 1.46 (s, 9H): $^{19}$F NMR (acetone-d6): δ −81.2 (m, 3F), −114.3 (m, 2F), −122.2 (s, 2F), −123.2 (s, 2F), −124.0 (s, 2F), −126.5 (m, 2F).

By using a similar procedure as described in example 1, treatment of compound 18 (10.g, 19.2 mmol) using trifluoroacetic acid provided compound 19 (6.4 g, 15.2 mmol, 79%): $^1$H NMR (acetone-d6) δ 3.63 (s 2H), 3.53 (t, J=6.8 Hz, 2H), 2.38 (m, 2H): $^{19}$F NMR (acetone-d6): δ −82.1 (m, 3F), −114.7 (m, 2F), −122.6 (s, 2F), −123.6 (s, 2F), −124.4 (s, 2F), −126.9 (m, 2F).

By using a similar procedure as described in example 1, reaction of compound 19 (4.0 g, 10.0 mmol) with n-octylisocyanate (1.4 g, 9.5 mmol) produced compound 20 (4.9 g, 8.5 mmol, 88%): Mp 137-140° C.: $^1$H NMR (methanol-d4) δ 3.78 (s 2H), 3.53 (t, J=7.2 Hz, 2H), 3.13 (q, J=6.8 Hz, 2H), 2.42 (m, 2H), 1.50 (m, 2H), 1.34 (m, 10H), 0.92 (t, J=6.8 Hz, 3H): $^{19}$F NMR (methanol-d4): δ −82.8 (m, 3F), −115.7 (m, 2F), −123.2 (s, 2F), −124.2 (s, 2F), −125.0 (s, 2F), −127.7 (m, 2F).

EXAMPLE 15

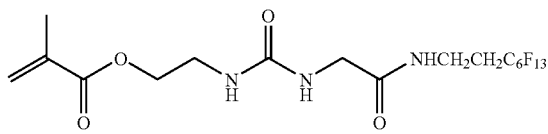

Compound 21

This example illustrates the synthesis of compound 21.

By using a similar procedure described in example 1, reaction of compound 19 (1.5 g, 3.57 mmol) with 2-isocyanatomethacrylate (0.554 g, 3.57 mmol) provided compound 21 (1.61. 2.8 mmol, 78%): Mp 95.5-96.7° C.: $^1$H NMR (acetone-d6): δ 7.33 (bs, 1H), 5.95 (m, 1H), 5.85 (bs, 1H), 5.77 (bs, 1H), 5.47 (m, 1H), 4.02 (q, J=6.0 Hz, 2H), 3.61 (s, 2H), 3.43 (q, J=6.8 Hz, 2H), 23.30 (m, 2H), 1.94 (t, J=1.2 Hz, 3H): $^{19}$F NMR (acetone-d6): δ −82.1 (m, 3F), −115.1 (m, 2F), −122.8 (s, 2F), −123.8 (s, 2F), −124.6 (s, 2F), −127.1 (m, 2F).

EXAMPLE 16

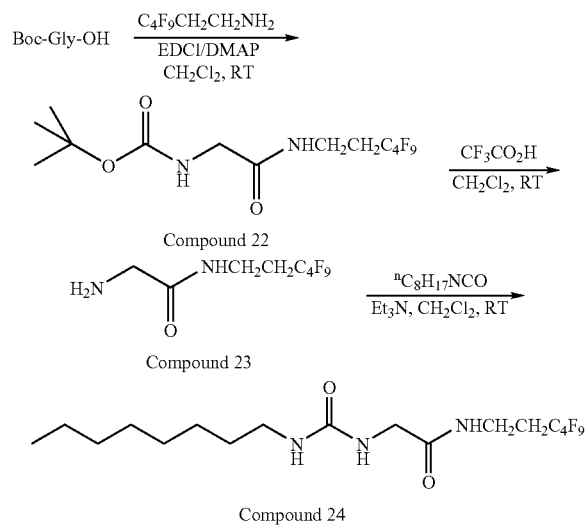

This example illustrates the synthesis of compound 22, and 24.

By using a similar procedure as described in example 1, reaction of N-BOC-Glycine (7.87 g, 45.0) with 1H,1H,2H,2H-perfluorohexylamine (11.8 g, 45.0 mmol) provided compound 22 (10.9 g, 25.0 mmol, 56%): Mp 65-66.5° C.: $^1$H NMR (CDCl$_3$): δ 6.61 (bs, 1H), 5.16 (bs, 1H), 3.80 (d, J=5.6 Hz, 2H), 3.64 (q, J=6.8 Hz, 2H), 2.38 (m, 2H), 1.40 (s, 9H): $^{19}$F NMR (CDCl$_3$): δ −81.5 (m, 3F), −114.5 (m, 2F), −124.9 (m, 2F), −126.4 (m, 2F).

By using a similar procedure as described in example 1, treatment of compound 22 (10.5 g, 25.0 mmol) using trifluoroacetic acid provided compound 23 as yellow oil (5.5 g, 17.1 mmol, 67%).

By using a similar procedure as described in example 1, reaction of compound 23 (2.0 g, 6.25 mmol) with n-octylisocyanate (0.97 g, 6.25 mmol) produced compound 24 (1.8 g, 3.79 mmol, 61%): Mp 116-117° C.: $^1$H NMR (acetone-d6): δ 7.51 (bs, 1H), 5.76 (bs, 2H), 3.79 (s, 2H), 3.57 (q, J=6.4 Hz), 3.13 (q, J=6.4 Hz, 2H), 2.50 (m, 2H), 1.47 (m, 2H), 1.31 (bs, 10H), 0.901 (t, J=6.4 Hz, 3H): $^{19}$F NMR (acetone-d6): δ −84.3 (m, 3F), −117. (m, 2F), −127.5 (m, 2F). −129.0 (m, 2F).

EXAMPLE 17

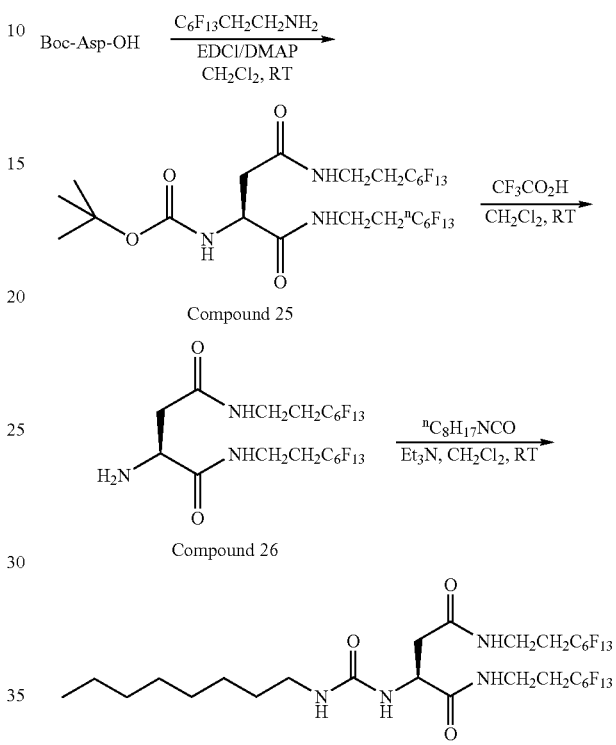

This example illustrates the synthesis of compound 25 and 27.

By using a similar procedure as described in example 1, reaction of N-BOC-aspartic acid (13.9 g, 60.0 mmol) with 1H,1H,2H,2H-perfluorooctylamine (43.6 g, 120.0 mmol) provided compound 25 (50.8 g, 55 mmol, 92%): Mp 162.5-164° C.: $^1$H NMR (acetone-d6): δ 7.68 (bs, 2H), 6.30 (bs, 1H), 4.35 (bs, 1H), 3.54 (bm, 4H), 3.03-2.65 (bm, 2H), 2.28 (bm, 4H), 1.37 (s, 9H): $^{19}$F NMR (acetone-d6): δ −81.6 (m, 6F), −114.3 (m, 4F), −122.5 (s, 4F), −123.5 (s, 4F), −124.2 (s, 4F), −126.8 (m, 4F).

By using a similar procedure as described in example 1, deprotection of 25 (49.0 g, 43.9 mmol) using trifluoroacetic acid produced compound 26 (36.2 g, 43.9 mmol, 83%): Mp 108° C.

By using a similar procedure as described in example 1, reaction of compound 26 (8.23 g, 10.0 mmol) with n-octyl isocyanate (1.55 g, 10.0 mmol) provided compound 27 (9.4 g, 9.6 mmol, 96%): Mp 183-185° C.: $^1$H NMR (acetone-d6): δ 7.78 (t, J=5.2 Hz, 1H), 7.68 (bs, 1H), 6.09, (bs, 1H), 5.90 (bs, 1H)], 4.62 (t, J=5.6 Hz, 1H), 3.57 (m, 4H), 3.18 (m, 2H), 2.80 (dd, J=15.6, 6.0 Hz, 1H), 2.66 (dd, J 15.2, 6.0 Hz, 1H), 2.47 (m, 4H), 1.51 (m, 2H), 1.31 (m, 10H), 0.89 (t, J=6.1 Hz, 3H):

$^{19}$F NMR (acetone-d6): δ −82.1 (m, 6F), −115.1 (m, 4F), −122.8 (s, 4F), −123.8 (s, 4F), −124.5 (s, 4F), −127.1 (m, 4F).

EXAMPLE 18

Compound 28

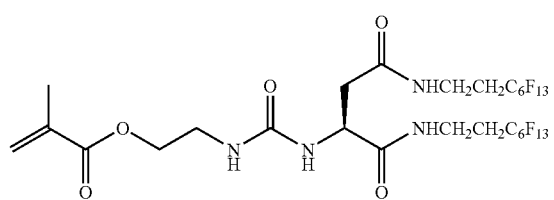

This example illustrates the synthesis of compound 28.

By using a similar procedure as described in example 1, reaction of compound 26 (5.43 g, 5.46 mmol) with 2-isocyanatoethylmethacrylate (0.847 g, 5.46 mmol) provided compound 28 (5.07 g, 5.2 mmol, 96%): Mp 149-151° C.: $^1$H NMR (acetone-d6): δ 7.48 (bs, 1H), 7.35 (bs, 1H), 6.02 (t, distorted, 2H), 5.94 (t, J=1.0 Hz, 1H), 5.48 (m, 1H), 4.41 (m, 1H), 4.05 (m, 2H, OCH$_2$), 3.40 (m, 4H), 3.30 (m, 2H), 2.60 m, 2H) 2.40-2.27 (m, 4H), 1.97 (t, J=1.6 Hz, 3H): $^{19}$F NMR (acetone d6): δ −82.1 (m, 6F), −115.1 (m, 4F), −122.8 (s, 4F), −123.8 (s, 4F), −124.5 (s, 4F), −127.1 (m, 4F).

EXAMPLE 19

Compound-29

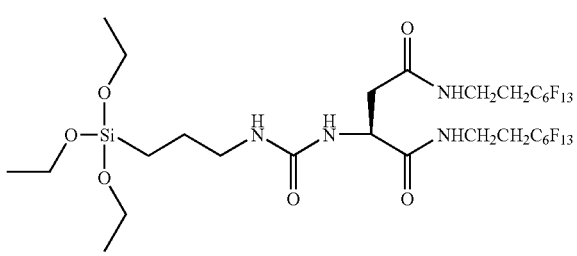

This example illustrates the synthesis of compound 29.

By using a similar procedure as described in example 1, reaction of compound 26 (3.29 g, 4.0 mmol) with 3-isocyanatopropyltriethoxysilane (0.9896 g, 4.0 mmol) provided compound 29 (4.0 g, 3.73 mmol, 93%): Mp 149-152° C.; $^1$H NMR (acetone-d6): δ 7.54 (t, J=5.6 Hz, 1H), 7.39 (t, J=5.2 Hz, 1H), 5.90 (d, J=8.4 Hz, 1H), 5.80 (t, J=6 Hz, 1H), 4.41 (q, J=6.8 Hz, 1H), 3.64 (q, J=7.0 Hz, 6H), 3.40 (m, 4H), 2.98 (m, 2H), 2.60 (m, 2H), 2.32 (m, 4H), 1.42 (quintet, J=7.2 Hz, 2H), 1.04 (t, J=6.8 Hz, 9H), 0.46 (tm, J=8.4 Hz, 2H): $^{19}$F NMR (acetone-d6): δ −82.1 (m, 3F), −115.1 (m, 2F), −122.8 (s, 2F), −123.8 (bs, 2F), −124.6 (bs, 2F), −127.2 (m, 2F).

EXAMPLE 20

Compound 30

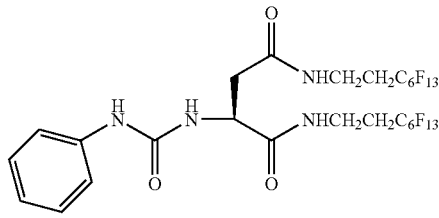

This example illustrates the synthesis of compound 30.

By using a similar procedure as described in example 1, reaction of compound 26 (2.05 g, 2.5 mmol) with phenyl isocyanate (0.297 g, 2.5 mmol) provided compound 30 (2.02 g, 2.11 mmoll, 86%): Mp 206-208° C.; $^1$H NMR (DMF-d7): δ. 8.96 (s, 1H), 8.24 (t, J=6.0 Hz, 1H), 7.49 (dd, J=8.0, 1.2 Hz, 2H), 7.23 (tm, J=8.0 Hz, 2H), 6.91 (tm, J=8.4 Hz, 1H), 6.71 (d, J=8.0 Hz, 2H). 4.62 (m, 1H), 3.51 (m, 4H), 2.81 (dd, J=15.6, 5.6 Hz, 1H), 2.62 (dd, J=15.6, 5.6 Hz, 1H), 2.48 (m, 4H): $^{19}$F NMR (DMF-d7): δ −81.6 (m, 6F), −114.4 (m, 4F), −122.5 (s, 4F), −123.4 (s, 4F), −123.4 (s, 4F), −126.7 (m, 4F).

EXAMPLE 21

Compound 31

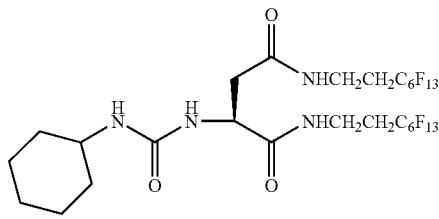

This example illustrates the synthesis of compound 31.

By using a similar procedure as described in example 1, reaction of compound 26 (2.05 g, 2.5 mmol) with cyclohexyl isocyanate (0.3125 g, 2.5 mmol) provided compound 31 (2.25 g, 2.37, 95%): Mp 190-192° C.; $^1$H NMR (DMF-d7, 100° C.): 7.75 (bs, 2H), 6.09 (d, J=8.0 Hz, 1H), 5.98 (bs, 1H), 3.55 (m, 4H), 2.63 (m, 2H), 2.55 (m, 4H), 1.99 (m, 2H), 1.83 (m, 2H), 1.72 (m, 1H), 1.42 (m, 2H), 1.29 (m, 2H): $^{19}$F NMR (DMF-d7): δ −86.7 (m, 6F), −118.7 (m, 4F), −126.9 (s, 4F), −127.9 (s, 4F), 128.7 (s, 4F), −131.1 (m, 4F).

EXAMPLE 22

Compound 32

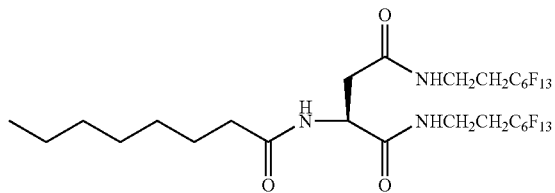

This example illustrates the synthesis of compound 32.

By using a similar procedure as described in example 8, reaction of compound 24 (2.05 g, 2.5 mmol) with n-octanoyl chloride (0.438 g, 2.7 mmol) provided compound 32 (1.3 g, 1.36 mmol,%): Mp 189-191° C.: $^1$H NMR (acetone-d6) δ 7.38 (bm, 2H), 7.26 (d, J=8.0 Hz, 1H), 4.56 (m, 1H), 3.93 (m, 4H), 2.54 (dd, J=15.2, 5.6 Hz, 1H), 2.47 (dd, J=15.2, 5.6 Hz, 1H), 2.34 (m, 4H), 2.07 (t, J=8.0 Hz, 2H), 1.45 (m, 2H), 1.18 (m, 8H), 0.74 (t, distorted, 3H): $^{19}$F NMR (Acetone-d6): δ −82.1 (m, 6F), −115.1 (m, 4F), −122.8 (s, 4F), −123.8 (s, 4F), −124.6 (s, 4F), −127.2 (m, 4F).

EXAMPLE 23

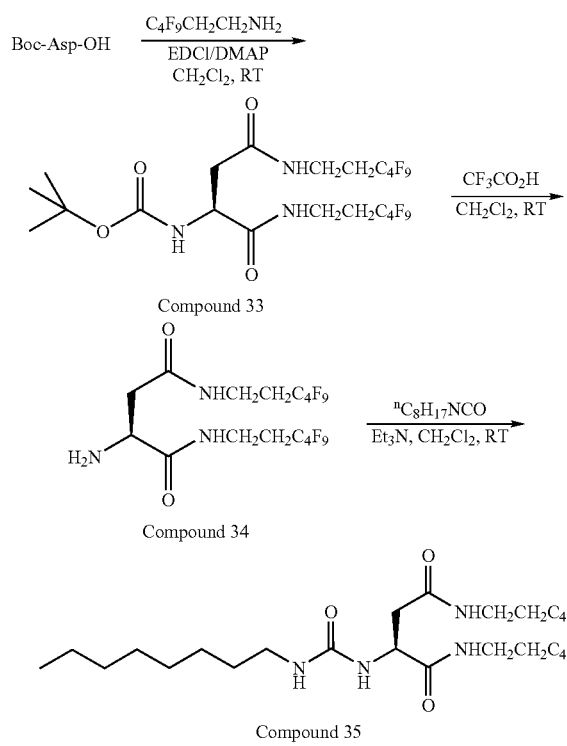

This example illustrates the synthesis of compound 33 and 35.

By using a similar procedure as described in example 1, reaction of N-BOC-aspartic acid (5.8 g, 25.0 mmol) with 1H,1H,2H,2H-perfluorohexylamine (14.2 g, 54.0 mmol) provided compound 33 (15.6 g, 21.6 mmol, 86%): Mp 155-156° C.; $^1$H NMR (acetone-d6): δ 7.57 (bs, 2H), 6.32 (bs, 1H) 4.38 (q, J=7 Hz, 1H), 3.55 (m, 4H), 2.69 (dd, J=16, 6 Hz, 1H), 2.64 (dd, J=16, 4 Hz, 1H), 2.45 (m, 4H), 1.4 (s, 9H): $^{19}$F NMR (acetone d6): δ −82.4 (m, 6F), −115.3 (m, 4F), −125.6 (s, 4F), −127.1 (m, 4F).

By using a similar procedure as described in example 1, compound 33 (14.8 g, 20.4 mmol) was deprotected using trifluoroacetic acid to obtain compound 34 (12.2 g, 19.58 mmol, 96%): Mp 81-82° C.

By using a similar procedure as described in example 1, reaction of compound 34 (6 g, 9.6 mmol) with octyl isocyanate (1.49 g, 9.6 mmol) provided compound 35 (2.9 g, 3.71 mmol, 93%): Mp 172° C.; $^1$H NMR (acetone-d6): δ 7.72 (bs, 1H), 7.58 (bs, 1H), 6.08 (d, J=8.0 Hz, 1H), 5.93 (bs, 1H) 4.58 (q, J=5.8 Hz, 1H), 3.55 (m, 4H), 3.15 (m, 2H), 2.74 (dd, J=15.2, 6.0 Hz, 1H), 2.55 (dd, J=15.2, 6.0 Hz, 1H), 2.47 (m, 4H), 1.48 (m, 2H), 1.30 (m, 10H), 0.90 (t, J=6.1 Hz, 3H): $^{19}$F NMR (acetone-d6): δ −82.4 (m, 6F), −115.3 (m, 4F), −125.5 (t, J=8.6 Hz, 4F), −127.1 (m, 4F).

EXAMPLE 24

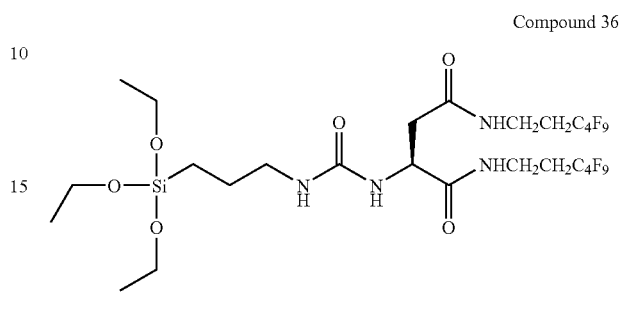

This example illustrates the synthesis of compound 36.

By using a similar procedure as described in example 1, reaction of compound 34 (1.56 g, 2.5 mmol) with 3-isocyanatopropyltriethoxysilane (0.618 g, 2.5 mmol) provided compound 36 (1.98 g, 2.27 mmol, 91%): Mp 129-132° C.; $^1$H NMR (CDCl$_3$): δ8.05 (bs, 1H), 7.45 (bs, 1H) 6.36 (bs, 1H), 5.41 (bs, 1H), 4.70 (bm, 1H), 4.04 (q, J=7.0 Hz, 6H), 3.72 (m, 4H), 3.48 (m, 2H), 3.06 (m, 2H), 2.72 (m, 1H), 2.51 (m, 1H), 2.26 (m, 4H), 1.48 (quintet, J=7.2 Hz, 2H), 1.10 (t, J=6.8 Hz, 9H), 0.51 (tm, J=8.4 Hz, 2H): $^{19}$F NMR (CDCl$_3$): δ −81.6 (m, 6F), −115.0 (m, 4F), −125.0 (bs, 4F), −126.6 (m, 4F).

EXAMPLE 25

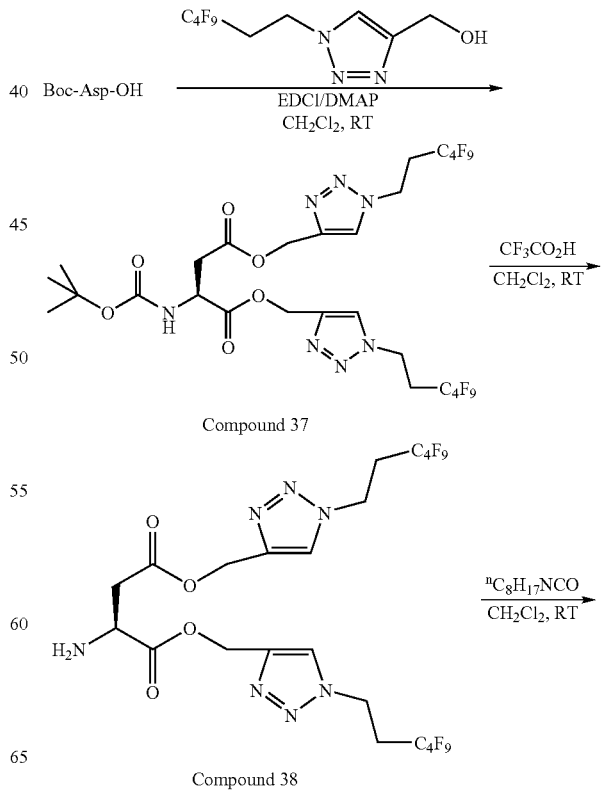

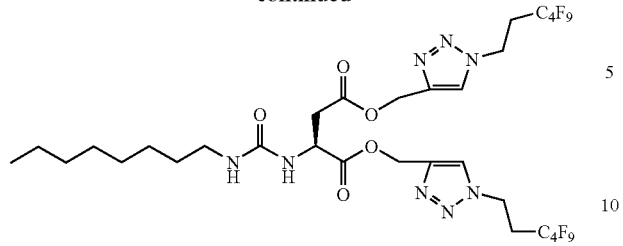

Compound 39

This example illustrates the synthesis of compound 37 and 39.

By using a similar procedure as described in example 1, reaction of reaction of N-BOC-aspartic acid (6.8 g, 29.0 mmol) with C4-Triazole-OH (20.0 g, 58.0 mol) followed by flash chromatography over silica gel provided compound 37 (15.9 g, 18.0 mmol, 62%). The resulting material was characterized by LC/MS (ES): MW=888, 788 (M-BOC).

By using a similar procedure as described in example 1, Compound 37 (12.3 g, 14.0 mmol) was deprotected using trifluoroacetic acid to obtain the TFA salt of compound 38, (LC/MS analysis (MW=788; free base) as a pale yellow oil (11.7 g). The TFA salt (7.7 g, 8.54 mmol) of was suspended in $CH_2Cl_2$ (30 mL) under nitrogen, and a solution of triethylamine (0.95 g, 9.40 mmol) in $CH_2Cl_2$ (10 mL) was slowly added while the reaction mixture was stirred. The oil went into solution, and a small amount of a fine white precipitate appeared. The reaction mixture was stirred for about 10 minutes, and then of water (20 mL) was added. The reaction mixture was transferred into a separatory funnel and extracted once more with $CH_2Cl_2$. The combined organic layers were dried ($MgSO_4$) and the solvent was removed by rotary evaporation. A pale yellow solid was obtained, that was rinsed with diethyl ether, and the resulting off-white solid was filtered and dried to obtain compound 38 (3.18 g).

By using a similar procedure as described in example 1, reaction of compound 38 (0.250 g, 0.32 mmol) with octyl isocyanate (0.052 g, 0.33 mmol) provided compound 39 (0.106 g, 0.112 mmol, 35%): $^1$H NMR (CD$_3$OD): δ 8.07 (br, 2H, triazole-CH, 5.30-5.15 (m, 4H, OCH$_2$), 4.80-4.74 (m, overlapped with solvent, triazole N—CH$_2$), 4.69 (t, 1H, aspartic-H), 3.08 (t, 2H, $^3J_{H-H}$=7 Hz, NHCH$_2$), 3.05-2.85 (m, 6H, RfCH$_2$ and C(=O)CH$_2$), 1.45 (m, 2H, CH$_2$), 1.31 (br s, 10H, CH$_2$), 0.90 (t, 3H, Me).

EXAMPLE 25-1

Compound 40

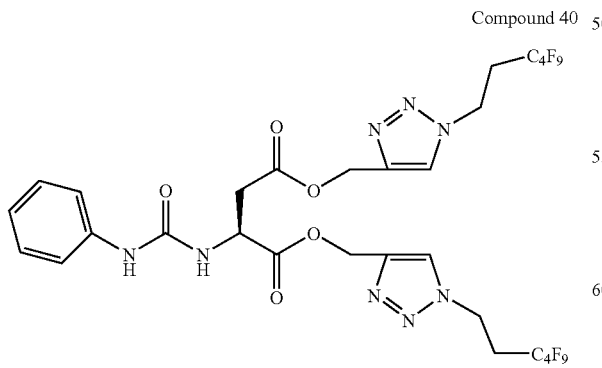

This example illustrates the synthesis of compound 40.
By using a similar procedure as described in example 1, reaction of compound 38 (0.250 g, 0.32 mmol) with phenyl isocyanate (0.040 g, 0.33 mmol) provided compound 40 (0.198 g, 0.022 mmol, 68%): $^1$H NMR (CD$_3$OD): δ 8.07 (d, 2H, $^3J_{H-H}$=6 Hz, triazole-CH), 7.32 (d, 2H, $^3J_{H-H}$=9 Hz, Ph-H$_o$), 7.24 (t, 2H, $^3J_{H-H}$=8 Hz, Ph-H$_m$), 6.98 (t, 1H, $^3J_{H-H}$=7 Hz, Ph-H$_p$), 5.30-5.15 (m, 4H, OCH$_2$), 4.80-4.74 (m, 7H), 3.00-2.80 (m, 6H, RfCH$_2$ and C(=O)CH$_2$).

EXAMPLE 25-2

Compound 41

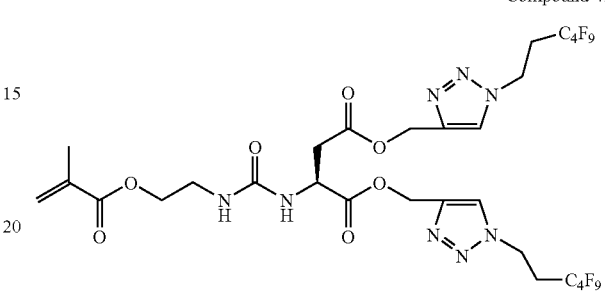

This example illustrates the synthesis of compound 41.
By using a similar procedure as described in example 1, reaction of compound 38 (0.250 g, 0.32 mmol) with 2-isocyanatoethylmethacrylate (0.052 g, 0.33 mmol) provided compound 41 (0.182 g, 0.193 mmol, 58%): $^1$H NMR (CD$_3$OD), δ, 8.08 (d, 2H, triazole-CH), 6.11 (s, 1H, =CH), 5.62 (s, 1H, =CH), 5.30-5.15 (m, 4H, OCH$_2$), 4.80-4.74 (m, overlapped with solvent, triazoleN-CH$_2$), 4.69 (t, 1H, aspartic-H), 4.14, 3.41 (t, 2H each, $^3J_{H-H}$=6 Hz, OCH$_2$CH$_2$NH), 3.05-2.85 (m, 6H, RfCH$_2$ and C(=O)CH$_2$), 1.93 (s, 3H, Me).

EXAMPLE 26

Step 1

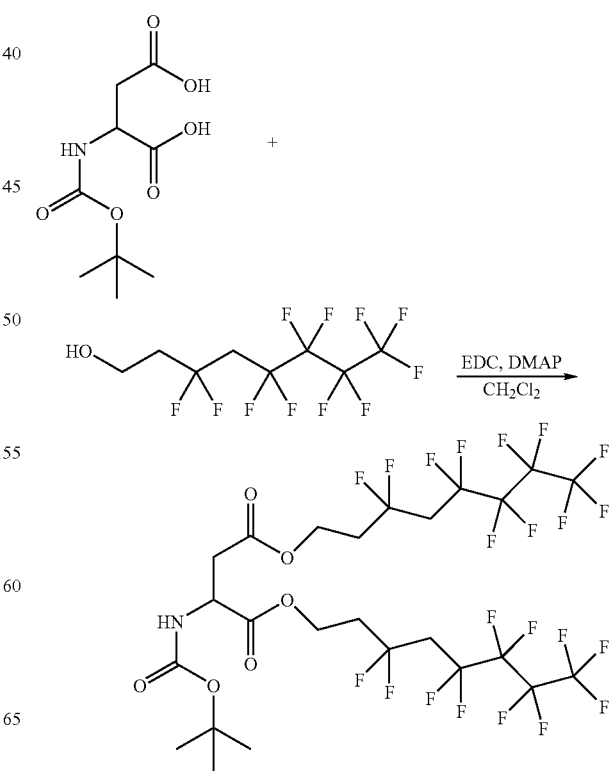

To a four-neck flask fitted with stir bar, addition funnel, and thermocouple, under nitrogen, was added Boc-L-aspartic acid (1.5 g, 0.0064 mol) and dry dichloromethane (75 mL), followed by N-3-dimethylaminopropyl)-N'-ethylcarbodiimide.HCl (2.5 g, 0.013 mol), and 4-(dimethylamino)pyridine (1.6 g, 0.013 mol). The reaction was stirred for 10 minutes, followed by the dropwise addition of compound A6 (4.2 g, 0.013 mol) in dry dichloromethane (2 mL). The mixture was stirred at RT overnight. LC/MS (API-ES+) confirmed the presence of the desired product (MW=875; M+Na. The mixture was subjected to an aqueous work-up, washed 2×20 mL of 2% HCl, 1×20 mL of saturated sodium bicarbonate, 1×20 mL of saturated sodium chloride, dried over magnesium sulfate, filtered, and concentrated in vacuo to give the product as a pale yellow oil (5.4 g, 98%).

Step 2

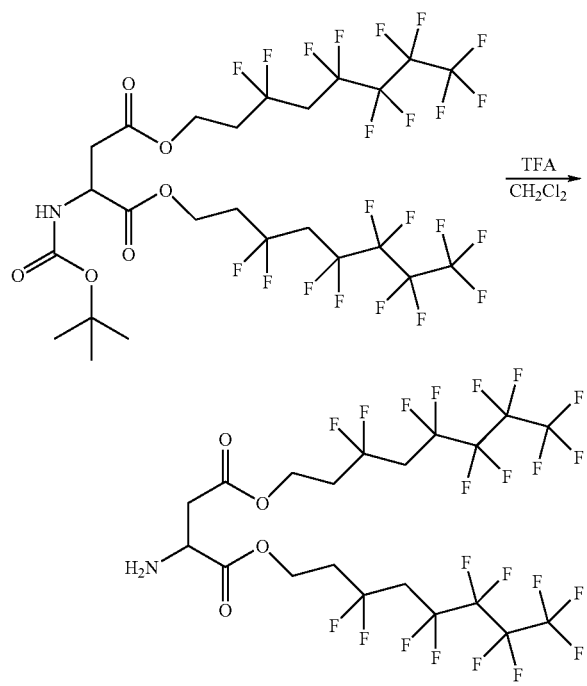

To the product from step 1 (5.4 g, 0.006 mol) was added dry dichloromethane (15 mL), followed by the dropwise addition of trifluoroacetic acid (3.9 mL, 0.051 mol). The reaction was stirred overnight at RT. Then the reaction was concentrated in vacuo at 35° C. Chloroform was added and the sample was reconcentrated twice. Saturated sodium bicarbonate (50 mL) was then added to the resulting oil, and it was stirred for 1 h, resulting in a little bit of a waxy orange solid, which was extracted 2×50 mL of chloroform. The combined organic layers were washed 1×50 mL of saturated sodium chloride, dried over magnesium sulfate, and concentrated to give a yellow oil (3.7 g, 81%). LC/MS (APCl+) showed 1 peak at 754 (M+H).

Step 3

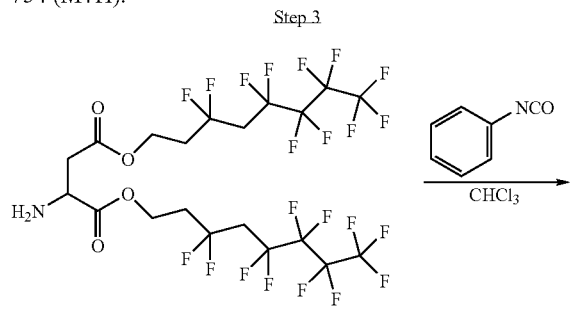

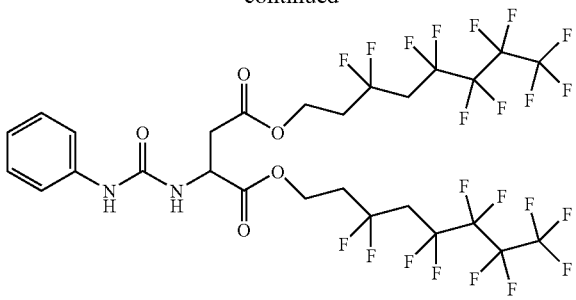

The reaction product from step 2 (3.7 g, 0.005 mol) in dry chloroform (25 mL) was cooled with a wet ice/acetone bath, and phenyl isocyanate (0.6 g, 0.005 mol) in dry chloroform (2 mL) was added dropwise. The reaction was stirred overnight at RT. LC/MS (APCl+) showed the presence of the desired product (873; M+H).

EXAMPLE 27

Gelation Test

About 0.5-5 wt % of a gelator in an organic solvent (of varying polarity) in a closed vial was heated to 5-10° C. below the boiling point of the solvent in a reactor block until a clear solution was obtained. The vials were allowed to cool at RT either by a slow cool by switching of the heat or by transferring the vials to a constant temperature water bath kept at RT. The state of the solution was evaluated after 2-12 h. Stable gel formation was tested by inversing the vial. The results are summarized in Table 2.

TABLE

| | Gelation conditions | | |
|---|---|---|---|
| Compound | Wt % gelator | Solvent | Appearance[†] |
| Compound 1 | 2 | $CH_2Cl_2$ | Partial Gel |
| Compound 3 | 1 | Acetone | Transparent |
| | 2 | n-Butanol | Gel |
| Compound 4 | 2 | Cyclohexane | Hazy Gel |
| | 2 | $CH_2Cl_2$ | Partial Gel |
| Compound 5 | 2 | Acetone | Partial Gel |
| Compound 6 | 2 | Toluene | Precipitate |
| Compound 7 | 2 | $CH_2Cl_2$ | Partial Gel |
| Compound 8 | 1-3 | Acetone or n-Butanol or THF | Thick Gel |
| Compound 10 | 1.5 | Acetone | Precipitate |
| | 1 | $CH_2Cl_2$ | Transparent |
| | 2 | THF | Gel |
| Compound 11 | 2 | Cyclohexane | Transparent |
| Compound 12 | 2 | Acetone | Gel |
| Compound 14 | 1 | Acetone | Transparent |
| Compound 15 | 4 | Acetone | Gel |
| Compound 16 | 2 | $CH_2Cl_2$ | Transparent |
| Compound 17 | 2 | Toluene | Gel |
| Compound 18 | 4 | Acetone | Clear solution |
| Compound 20 | 1 | Acetone | Thick Gel |
| Compound 21 | 4 | Acetone | Partial Gel |
| Compound 22 | 1-3 | Acetone or $CH_2Cl_2$ | Partial Gel |
| Compound 24 | 2 | Acetone | Clear solution |
| Compound 25 | 2 | $CH_2Cl_2$ | Partial Gel |
| | 4 | Acetone | Thick Gel |
| Compound 27 | 4 | n-Butanol | Partial Gel |
| Compound 28 | 2 | Toluene or Acetone | Clear solution |
| Compound 29 | 2 | Toluene | Hazy Gel |
| Compound 30 | 2 | $CH_2Cl_2$ | Transparent |
| Compound 31 | 2 | $CH_2Cl_2$ | Gel |
| Compound 32 | 1 | $CH_2Cl_2$ | Transparent |
| | 2 | Acetone | Gel |

TABLE-continued

Gelation conditions

| Compound | Wt % gelator | Solvent | Appearance[†] |
|---|---|---|---|
| Compound 33 | 2 | $CH_2Cl_2$ | Thick Gel |
| Compound 35 | 4.5 | n-Butanol | Partial Gel |
| Compound 36 | 2 | Toluene | Partial Gel |
| Compound 39 | 2 | Toluene | Partail Gel |
| Compound 40 | 2 | Toluene, n-Butanol | Thick Gel |
| Compound 41 | 2 | Benzene | Transparent Gel |
| | | | Transparent Gel |
| | | | Hazy Gel |
| | | | Transparent Gel |
| | | | Partial Gel |
| | | | Transparent Gel |
| | | | Precipitate |
| | | | Hazy Gel |

[†]Hazy gel: solid gel partially transparent. Transparent gel: solid gel completely transparent. Thick gel: solid gel not-transparent. Partial gel: solid or semi-moving gel which has some free flowing liquid in it. Precipitate: more like a precipitate than a gel.

EXAMPLE 28

Contact Angle Measurements

Contact angle (CA) measurements to determine the contact angle of both water and hexadecane on a surface were performed using a goniometer. Ramé-Hart Standard Automated Goniometer Model 200 employing DROPimage standard software and equipped with an automated dispensing system with 250 μl syringe was used, having an illuminated specimen stage assembly. The goniometer camera was connected through an interface to a computer and this allowed the droplet to be visualized on a computer screen. The horizontal axis line and the cross line could both be independently adjusted on the computer screen using the software.

Prior to contact angle measurement, the sample was placed on the sample stage and the vertical vernier adjusted to align the horizontal line (axis) of the eye piece coincident to the horizontal plane of the sample, and the horizontal position of the stage relative to the eye piece positioned so as to view one side of the test fluid droplet interface region at the sample interface.

To determine the contact angle of the test fluid on the sample, approximately one drop of test fluid was dispensed onto the sample using a 30 μL pipette tip and an automated dispensing system to displace a calibrated amount of the test fluid. For water measurements deionized water was employed, and for oil measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is that angle determined immediately after dispensing the test fluid to the sample surface. Initial contact angles above 30 degrees are indicators of effective water and oil repellency. Contact angle can be measured after the droplet has been added to a surface (advancing contact angle, abbreviated "Adv CA") or after the droplet has been partially withdrawn from a surface (receding contact angle, abbreviated "Rec CA").

TABLE 3

Contact angle[a,b]

| | Water | | Hexadecane | |
|---|---|---|---|---|
| Compound | Adv CA | Rec CA | Adv CA | Rec CA |
| Compound 1 | 97 ± 2 | 63 ± 3 | 66 ± 5 | 35 ± 2 |
| Compound 3 | 140 ± 4 | 117 ± 4 | 96 ± 2 | 53 ± 2 |
| Compound 4 | 105 ± 2 | 77 ± 1 | 76 ± 2 | 42 ± 1 |
| Compound 5 | 95 ± 2 | 63 ± 3 | 56 ± 1 | 32 ± 2 |
| Compound 6 | 118 ± 4 | 63 ± 2 | 82 ± 4 | 36 ± 2 |
| Compound 7 | 117 ± 2 | 84 ± 4 | 74 ± 1 | 43 ± 2 |
| Compound 8 | 87 ± 1 | 53 ± 1 | 65 ± 2 | 37 ± 1 |
| Compound 10 | 104 ± 4 | 62 ± 3 | 75 ± 4 | 45 ± 2 |
| Compound 11 | 108 ± 1 | 81 ± 3 | 70 ± 1 | 41 ± 2 |
| Compound 12 | 88 ± 1 | 50 ± 2 | 59 ± 2 | 22 ± 1 |
| Compound 14 | 94 ± 1 | 56 ± 3 | 59 ± 1 | 33 ± 1 |
| Compound 15 | 90 ± 2 | 55 ± 2 | 56 ± 2 | 35 ± 1 |
| Compound 16 | 94 ± 2 | 57 ± 1 | 57 ± 2 | 32 ± 1 |
| Compound 17 | 106 ± 3 | 64 ± 2 | 69 ± 3 | 36 ± 2 |
| Compound 18 | 84 ± 2 | 47 ± 1 | 56 ± 3 | 30 ± 1 |
| Compound 20 | 116 ± 2 | 92 ± 2 | 97 ± 3 | 50 ± 3 |
| Compound 21 | 105 ± 3 | 84 ± 1 | 63 ± 2 | 37 ± 1 |
| Compound 22 | 89 ± 2 | 49 ± 2 | 56 ± 2 | 31 ± 2 |
| Compound 24 | 126 ± 1 | 54 ± 4 | 90 ± 1 | 27 ± 3 |
| Compound 25 | 129 ± 1 | 70 ± 4 | 85 ± 1 | 37 ± 2 |
| Compound 27 | 132 ± 7 | 89 ± 2 | 94 ± 8 | 52 ± 2 |
| Compound 28 | 118 ± 2 | 63 ± 4 | 86 ± 2 | 57 ± 1 |
| Compound 29 | 124 ± 3 | 96 ± 2 | 87 ± 3 | 50 ± 1 |
| Compound 30 | 122 ± 3 | 55 ± 1 | 76 ± 1 | 43 ± 1 |
| Compound 31 | 121 ± 9 | 77 ± 9 | 71 ± 1 | 45 ± 4 |
| Compound 32 | 119 ± 1 | 77 ± 1 | 77 ± 1 | 55 ± 1 |
| Compound 33 | 91 ± 2 | 65 ± 1 | 71 ± 2 | 40 ± 1 |
| Compound 35 | 84 ± 1 | 64 ± 2 | 52 ± 3 | 22 ± 2 |
| Compound 36 | 112 ± 3 | 77 ± 2 | 73 ± 2 | 44 ± 1 |

[a]average of 3 runs at different positions on each sample,
[b]slight variations observed depending on the quality of the film prepared as well as .solvent used. A good gelling solvent for a particular compound and a uniform film results high and consistent values.

A 1 wt % solution of above compounds in THF, MeCN or actone were dip coated onto Mylar® PET film (Du Pont Teijin Films, Hopewell, Va. 23860) The films were then air or vacuum dried for 24 h before measuring the contact angles and the values are summarized in Table 3.

EXAMPLES 29-38

Gel-Impregnation Methods

Method 1. Gel Formation in the Presence of a Substrate.

Non woven fabrics or filter paper samples (about 3.0-3.5 cm squared) were immersed in a suspension of a gelator in organic solvent kept in closed reaction flask equipped with a stir bar and temperature controller. The mixtures were heated 5° C. below the boiling point of the solvent for 1-2 hours until clear solutions formed. The flasks were then either rapidly cooled to RT by removing the oil bath or slowly cooled to RT by switching off the heat. Gel formation was usually observed in 2-6 h time and the gels were allowed to age for additional 6 h. The gelator impregnated samples removed and dried in a vacuum oven at RT or with critical point drying using carbon dioxide. The dried samples were weighed and used for contact angle measurements.

Method 2. Spreading of Preformed Gel on a Substrate

A suspension of gelator in organic solvent in a closed reaction flask equipped with a stir bar and temperature controller was heated in an oil bath about 5° C. below the boiling point of the solvent for 1-2 h. The clear solution formed was either rapidly cooled to RT by removing the oil bath or slowly cooled by switching off the heat. Gel formation was usually observed in 2-6 h time and was allowed to age for additional 6 h. The aged gel was spread across a clean substrate using a flat spatula and immediately dried under vacuum at RT. The dried samples were weighed and used for contact angle measurements.

EXAMPLE 29

This example illustrates the gel impregnation of Compound 3 on Tyvek® polyethylene nonwoven fabric (E.I. du Pont de Nemours, Wilmington Del.), By following the procedure as described in Method 1, for gel impregnation in the presence of a substrate, weighed samples of Tyvek® (3.0 cm×3.0 cm) were gel impregnated with 1 wt % compound 3 in acetone and dried under vacuum at RT. The dried gel-impregnated Tyvek® nonwoven fabric samples were then used for contact angle measurements. The CA results are summarized in Table 4.

EXAMPLE 30

Figure 2:
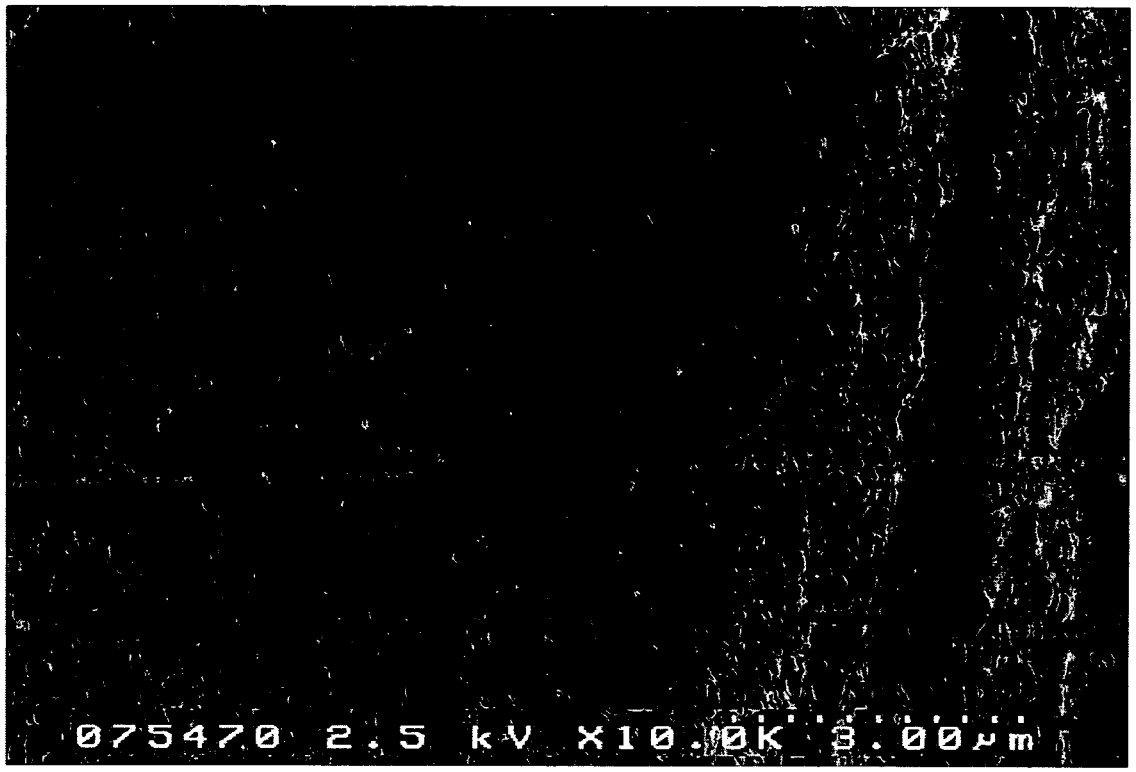
FIG. 2 illustrates a scanning electron micrograph at 10000× magnification of a nanoweb composite of the invention.

Following the procedure as described in Method 1, weighed samples of Kolon® spunbound polyester fabric (Korea Vilene Inc., (70 gsm, 3.0 cm×3.0 cm) were gel impregnated with 1 wt % compound 3 in acetone and dried under vacuum at RT. Scanning electron microscopy was used to image the composite sample at 10,000× magnification, showing the nanoweb structure (FIG. 2). The dried gel-impregnated samples were then used for contact angle measurements. The CA results are summarized in Table 4.

EXAMPLE 31

Following the procedure as described in Method 1, weighed samples of Whatman® No 40 filter paper (Whatman Inc., Clifton, N.J., 3.0 cm×3.0 cm) were gel impregnated with 1 wt % compound 3 in acetone and dried under vacuum at RT. The dried gel-impregnated samples were then used for contact angle measurements. The CA results are summarized in Table 4.

TABLE 4

|  | Contact angle[a] | | | |
| --- | --- | --- | --- | --- |
|  | Water | | Hexadecane | |
| Compound 3 | Adv CA | Rec CA | Adv CA | Rec CA |
| Tyvek ® fabric | 149 ± 1 | 141 ± 3 | 104 ± 2 | 71 ± 4 |
| Kolon ® fabric 70 gsm | 159 ± 2 | 148 ± 3 | 127 ± 1 | 89 ± 3 |
| Whatman ® 40 filter paper | 127 ± 4 | 104 ± 4 | 123 ± 7 | 86 ± 2 |

[a]average of 3 runs at different positions on each sample

EXAMPLE 32 (COMPARATIVE)

For comparison the contact angle values for untreated controls, TYVEK® fabric, Kolon® fabric, 70 gsm, and Whatman® 40 filter paper, contact angles were measured and are summarized in Table 5.

TABLE 5

|  | Contact angle[a] | | |
| --- | --- | --- | --- |
|  | Water[a] | | |
| Untreated samples | Adv CA | Rec CA | Hexadecane |
| Tyvek ® fabric | 108 ± 1 | 78 ± 1 | Completely absorbed |
| Kolon ®-fabric, 70 gsm | 115 ± 4 | 85 ± 4 | Completely absorbed |
| Whatman ® 40 filter paper | Completely absorbed | | Completely absorbed |

[a]average of 3 runs at different positions on each sample

EXAMPLE 33

This example illustrates gel impregnation of compound 10 on Tyvek® nonwoven fabric and Kolon® nonwoven fabric (gsm-70).

Following the procedure described in Method 1, weighed samples of Tyvek® nonwoven fabric (3.0 cm×3.0 cm) and Kolon® nonwoven fabric, (gsm 70, 3.0 cm×3.0 cm) were gel impregnated from a gel obtained by cooling a 2.5 wt % solution of compound 10 in acetone. The samples were dried under vacuum at RT. and used for CA measurements summarized in Table 6.

TABLE 6

|  | Contact angle[a] | | | |
| --- | --- | --- | --- | --- |
|  | Water | | Hexadecane | |
| Compound 10 | Adv CA | Rec CA | Adv CA | Rec CA |
| Tyvek ® fabric | 144 ± 2 | 132 ± 1 | 80 ± 3 | 56 ± 2 |
| Kolon ® fabric 70 gsm | 159 ± 1 | 147 ± 3 | 121 ± 4 | 97 ± 2 |

[a]average of 3 runs at different positions on each sample

EXAMPLE 34

This example illustrates gel impregnation of compound 14 on Tyvek® nonwoven fabric and Kolon® nonwoven fabric (gsm-70).

Following the procedure described in Method 1, weighed samples of Tyvek® nonwoven fabric (3.0 cm×3.0 cm) and Kolon® nonwoven fabric, (gsm 70, 3.0 cm×3.0 cm) were gel impregnated from a gel obtained by cooling a 2.5 wt % solution of compound 14 in acetone. The samples were dried under vacuum at RT. and used for CA measurements summarized in Table 7.

TABLE 7

|  | Contact angle[a] | | | |
| --- | --- | --- | --- | --- |
|  | Water | | Hexadecane | |
| Compound 14 | Adv CA | Rec CA | Adv CA | Rec CA |
| Tyvek ® fabric | 144 ± 4 | 134 ± 2 | 71 ± 3 | 41 ± 1 |
| Kolon ® fabric 70 gsm | 150 ± 3 | 136 ± 1 | 57 ± 2 | 39 ± 3 |

[a]average of 3 runs at different positions on each sample

EXAMPLE 35

This example illustrates gel impregnation of Compound 20 on Tyvek® nonwoven fabric, Kolon® nonwoven fabric (gsm-70) and Whatman® 40 filter paper.

Following the procedure described in Method 1, weighed samples of Tyvek® nonwoven fabric (3.0 cm×3.0 cm), Kolon® nonwoven fabric, (gsm 70, 3.0 cm×3.0 cm) and Whatman® 40 filter paper (3.0 cm×3.0 cm) were gel impregnated from a gel obtained by cooling a 2 wt % solution of compound 20 in acetone. The samples were dried under vacuum at RT. and used for CA measurements summarized in Table 8

TABLE 8

| | Contact angle[a] | | | |
|---|---|---|---|---|
| | Water | | Hexadecane | |
| Compound 20 | Adv CA | Rec CA | Adv CA | Rec CA |
| Tyvek ® fabric | 145 ± 2 | 137 ± 1 | 118 ± 1 | 77 ± 5 |
| Kolon ® fabric 70 gsm | 163 ± 3 | 151 ± 2 | 135 ± 6 | 118 ± 2 |
| Whatman ® 40 filter paper | 136 ± 6 | 127 ± 1 | 139 ± 4 | 87 ± 3 |

[a]average of 3 runs at different positions on each sample

EXAMPLE 36

This example illustrates gel impregnation of Compound 24 on Tyvek® nonwoven fabric and Kolon® nonwoven fabric (gsm-70).

Following the procedure described in Method 1, weighed samples of Tyvek® nonwoven fabric (3.0 cm×3.0 cm) and Kolon® nonwoven fabric, (gsm 70, 3.0 cm×3.0 cm) were gel impregnated from a gel obtained by cooling a 2 wt % solution of compound 24 in acetone. The samples were dried under vacuum at RT. and used for CA measurements summarized in Table 9.

TABLE 9

| | Contact angle[a] | | | |
|---|---|---|---|---|
| | Water | | Hexadecane | |
| Compound 24 | Adv CA | Rec CA | Adv CA | Rec CA |
| Tyvek ® fabric | 141 ± 4 | 134 ± 1 | 89 ± 2 | 64 ± 1 |
| Kolon ® fabric 70 gsm | 157 ± 6 | 144 ± 3 | 94 ± 5 | 61 ± 3 |

[a]average of 3 runs at different positions on each sample

EXAMPLE 37

This example illustrates gel impregnation of Compound 27 on Tyvek® nonwoven fabric, Kolon® nonwoven fabric (gsm-70)

Following the procedure described in Method 1, weighed samples of Tyvek® nonwoven fabric (3.0 cm×3.0 cm) and Kolon® nonwoven fabric, (gsm 70, 3.0 cm×3.0 cm) were gel impregnated from a gel obtained by cooling a 4 wt % solution of compound 27 in n-butanol. The samples were dried under vacuum at RT. and used for CA measurements summarized in Table 10.

TABLE 10

| | Contact angle[a] | | | |
|---|---|---|---|---|
| | Water | | Hexadecane | |
| Compound 27 | Adv CA | Rec CA | Adv CA | Rec CA |
| Tyvek ® fabric | 154 ± 2 | 153 ± 6 | 155 ± 2 | 133 ± 0 |
| Kolon ® fabric 70 gsm | 152 ± 4 | 135 ± 2 | 126 ± 2 | 84 ± 2 |

[a]average of 3 runs at different positions on each sample

Following the procedure described in Method 2, weighed samples of Tyvek® nonwoven fabric (3.0 cm×3.0 cm) and Kolon® nonwoven fabric, (gsm 70, 3.0 cm×3.0 cm) were gel impregnated with a gel obtained by cooling a 4 wt % solution of compound 27 in n-butanol. The samples were dried under vacuum at RT. and used for CA measurements summarized in Table 11.

TABLE 11

| | Contact angle[a] | | | |
|---|---|---|---|---|
| | Water | | Hexadecane | |
| Compound 27 | Adv CA | Rec CA | Adv CA | Rec CA |
| Tyvek ® fabric | 151 ± 2 | 109 ± 2 | 127 ± 1 | 87 ± 2 |
| Kolon ® fabric 70 gsm | 148 ± 3 | 114 ± 5 | 134 ± 1 | 80 ± 2 |

[a]average of 4 runs at different positions on each sample

EXAMPLE 38

This example illustrates gel impregnation of Compound 35 on Tyvek® nonwoven fabric, Kolon® nonwoven fabric (gsm-70)

Following the procedure described in Method 1, weighed samples of Tyvek® nonwoven fabric (3.0 cm×3.0 cm) and Kolon® nonwoven fabric, (gsm 70, 3.0 cm×3.0 cm) were gel impregnated from a gel obtained by cooling a 4.5 wt % solution of compound 35 in n-butanol. The samples were dried under vacuum at RT. and used for CA measurements summarized in Table 12.

TABLE 12

| | Contact angle[a] | | | |
|---|---|---|---|---|
| | Water | | Hexadecane | |
| Compound 35 | Adv CA | Rec CA | Adv CA | Rec CA |
| Tyvek ® fabric | 149 ± 2 | 135 ± 5 | 92 ± 1 | 61 ± 3 |
| Kolon ® fabric 70 gsm | 152 ± 1 | 132 ± 4 | 84 ± 3 | 56 ± 5 |

[a]average of 3 runs at different positions on each sample

Following the procedure described in Method 2, weighed samples of Tyvek® nonwoven fabric (3.0 cm×3.0 cm) and Kolon® nonwoven fabric, (gsm 70, 3.0 cm×3.0 cm) were gel impregnated with a gel obtained by cooling a 4.5 wt % solution of compound 35 in n-butanol. The samples were dried under vacuum at RT. and used for CA measurements summarized in Table 12.

TABLE 12

| | Contact angle[a] | | | |
|---|---|---|---|---|
| | Water | | Hexadecane | |
| Compound 35 | Adv CA | Rec CA | Adv CA | Rec CA |
| Tyvek ® fabric | 140 ± 2 | 94 ± 4 | 56 ± 3 | 53 ± 1 |
| Kolon ® fabric70 gsm | 158 ± 4 | 111 ± 3 | 70 ± 1 | 28 ± 1 |

[a]average of 4 runs at different positions on each sample

What we claim is:

1. A composition of formula (I)

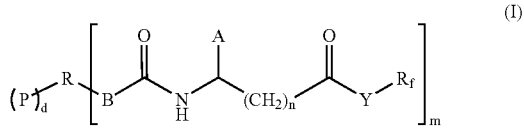

wherein A is independently selected from the group consisting of:
hydrogen, $C_1$-$C_5$ straight and branched chain alkyl, phenyl, benzyl, and —C(O)—Y—$R_f$;
Y is independently —O— or —NH—;
$R_f$ is a monovalent group selected from the group consisting of formulas (IIa), (IIb) (IIc) and (IId):

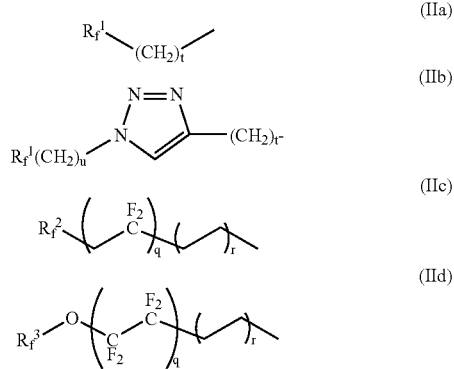

$R_f^1$ and $R_f^2$ are $C_1$-$C_6$ linear or branched perfluoroalkyl;
$R_f^3$ is a $C_1$ to $C_7$ linear or branched perfluoroalkyl group, optionally interrupted by one, two or three ether oxygen atoms;
u and t are independently integers of 1 to 10;
q and r are independently integers of 1 to 3;
n is an integer of 0 to 10;
B is independently selected from the group consisting of: —O—, —NH—, and a covalent bond;
P is selected from the group consisting of: $(R^1O)_3Si$— and $CH_2$=$C(R^2)$—$CO_2$—;
wherein $R^1$ is a $C_1$-$C_6$ straight and branched chain alkyl; $R^2$ is a hydrogen, F, Cl or —$CH_3$;
R is a monovalent, divalent, trivalent or tetravalent group having 1 to 60 carbon atoms;
d is an integer of 0 or 1; and
m is an integer of 1-4;
with the provisos that m+d≤4;
R has at least m+d carbon atoms with each valence residing on a different carbon atom; and
when Y is —O—, $R_f$ is selected from formulas (IIb), (IIc) or (IId).

2. The composition of claim 1 wherein m=1 or 2, d=0, and B is —NH— or a covalent bond.

3. The composition of claim 2 wherein m=1 and B is —NH—.

4. The composition of claim 2 wherein m=2 and B is —NH—.

5. The composition of claim 2 wherein B is —NH—, and A is hydrogen or —C(O)—Y—$R_f$.

6. The composition of claim 5 wherein A is hydrogen and n=1 or 2.

7. The composition of claim 1 wherein m=1, d=0, and B is a covalent bond.

8. The composition of claim 1 wherein m=1 and d=1.

9. The composition of claim 8 wherein B is —NH—.

10. The composition of claim 1 wherein $R_f$ is selected from formulas (IIb), (IIc) or (IId).

11. The composition of claim 1, wherein R is selected from the group consisting of: $C_1$-$C_{18}$ linear or branched alkyl groups; $C_1$-$C_{18}$ linear or branched alkyl groups having, or interrupted by, a $C_4$-$C_{16}$ cycloaliphatic group; $C_1$-$C_{18}$ linear or branched alkyl groups having, or interrupted by, a $C_4$-$C_{16}$ aromatic group; $C_1$-$C_{18}$ linear or branched alkyl groups having, or interrupted by, a $C_4$-$C_{16}$ cycloaliphatic group and a $C_4$-$C_{16}$ aromatic group; $C_4$-$C_{16}$ cycloaliphatic group; a $C_4$-$C_{16}$ aromatic group; and $C_4$-$C_{16}$ cycloaliphatic group having a $C_4$-$C_{16}$ aromatic group; wherein each aromatic group is optionally substituted with one or more Cl or Br; each alkyl and cycloaliphatic group is optionally substituted with one or two carbon-carbon double bonds; each group is optionally interrupted by one to four heteroatoms selected from the group: —O— and —$NR^3$—; and each group is optionally interrupted by one to four linkers selected from the group —S—, —N=, —OC(O)—, —C(O)$NR^3$—, —OC(O)$NR^3$—, —$NR^3$C(O)$NR^3$—; wherein $R^3$ is selected from the group consisting of: hydrogen and $C_1$-$C_4$ alkyl group.

12. The composition of claim 1, wherein R is a linear or branched alkyl group of about 10 to about 60 carbon atoms, interrupted by about 5 to about 30 ether oxygen atoms, wherein the ratio of ether oxygen atoms to carbon atoms is about 1:2 to about 1:4.

13. A composite material comprising a porous support and a porous nanoweb, wherein said porous nanoweb comprises fibrous structures of about 10 nm to about 1000 nm effective average fiber diameter as determined with electron microscopy; said fibrous structures comprising one or more compositions of claim 1.

14. The composite material of claim 13 wherein the composition of claim 1 forms a coating on the porous support.

15. The composite material of claim 13 wherein the porous support is selected from the group consisting of woven fabrics comprising glass, polyamides, polyesters, and combinations thereof; and nonwoven fabrics comprising glass, paper, cellulose acetate and nitrate, polyamides, polyesters, polyolefins, and combinations thereof.

16. A solid substrate to which has been applied a composition of claim 1.

17. The solid substrate of claim 16 that is selected from the group consisting of stone, masonry, concrete, unglazed tile, brick, porous clay, granite, limestone, grout, mortar, marble, wood, gypsum board, terrazzo, or composite materials.

* * * * *

UNITED STATES PATENT AND TRADEMARK OFFICE
CERTIFICATE OF CORRECTION

| | | |
|---|---|---|
| PATENT NO. | : 7,473,658 B2 | Page 1 of 1 |
| APPLICATION NO. | : 11/598293 | |
| DATED | : January 6, 2009 | |
| INVENTOR(S) | : Erick Jose Acosta et al. | |

It is certified that error appears in the above-identified patent and that said Letters Patent is hereby corrected as shown below:

Title page item [75]
Please correct inventor's name from Sunti Moudgil to Suniti Moudgil.

Signed and Sealed this

Tenth Day of March, 2009

JOHN DOLL
*Acting Director of the United States Patent and Trademark Office*